(12) United States Patent
Preta

(10) Patent No.: US 6,669,425 B1
(45) Date of Patent: Dec. 30, 2003

(54) SELF-THREADING FASTENER FOR CONNECTING AN ARTICLE TO A SURFACE UPON MOVEMENT OF THE ARTICLE TOWARDS THE FASTENER

(76) Inventor: John Preta, 11605 Coldstream Dr., Potomac, MD (US) 20854

( * ) Notice: Subject to any disclaimer, the term of this patent is extended or adjusted under 35 U.S.C. 154(b) by 0 days.

(21) Appl. No.: 10/103,852

(22) Filed: Mar. 25, 2002

(51) Int. Cl.[7] .............................................. F16B 15/00
(52) U.S. Cl. ...................... 411/458; 411/388; 411/453; 411/469
(58) Field of Search ................................. 411/388, 107, 411/921, 453, 454, 457, 458, 401, 469, 480, 389, 386

(56) References Cited

U.S. PATENT DOCUMENTS

| | | | |
|---|---|---|---|
| 3,662,643 A | | 5/1972 | Scheffer |
| 4,350,464 A | | 9/1982 | Brothers |
| 4,604,846 A | * | 8/1986 | Ekstrom ...................... 52/704 |
| 4,846,622 A | * | 7/1989 | Lien ........................... 411/103 |
| 5,189,856 A | | 3/1993 | Windstrup |
| 5,433,043 A | * | 7/1995 | Hibbitt et al. .................. 52/27 |
| 5,762,456 A | * | 6/1998 | Aasgaard ...................... 411/29 |
| 6,062,786 A | * | 5/2000 | Garver et al. ............... 411/386 |

FOREIGN PATENT DOCUMENTS

| | | | | |
|---|---|---|---|---|
| EP | 0228993 A2 | * | 12/1986 | ........... F16B/19/14 |
| GB | 0654181 | * | 6/1951 | ................. 411/388 |

OTHER PUBLICATIONS

Gillis, Macdonald. U. S. Pat. App. Pub. US 2002/0015627 A1.*

* cited by examiner

Primary Examiner—Flemming Saether
Assistant Examiner—Jori Schiffman
(74) Attorney, Agent, or Firm—John Preta

(57) ABSTRACT

A fastener that cuts into or self-threads into an article upon movement of the article towards the fastener and a method of securing the article via the fastener. The fastener includes a connecting member having a first end which is adapted to be secured to a surface and a second end, a member rotatably mounted on the connecting member and being substantially axially retained with respect to the connecting member. The member includes at least one of an external thread, a spline and a row of teeth. A stop surface is arranged between the first end and the second end, and the stop surface is adapted to engage the surface. Wherein, when the article is moved into engagement with the member of the fastener, the member is caused to at least one of rotate with respect to the connecting member and cut into the article. The method provides for attaching the first end of connecting member to the surface, and moving the article towards the member.

22 Claims, 16 Drawing Sheets

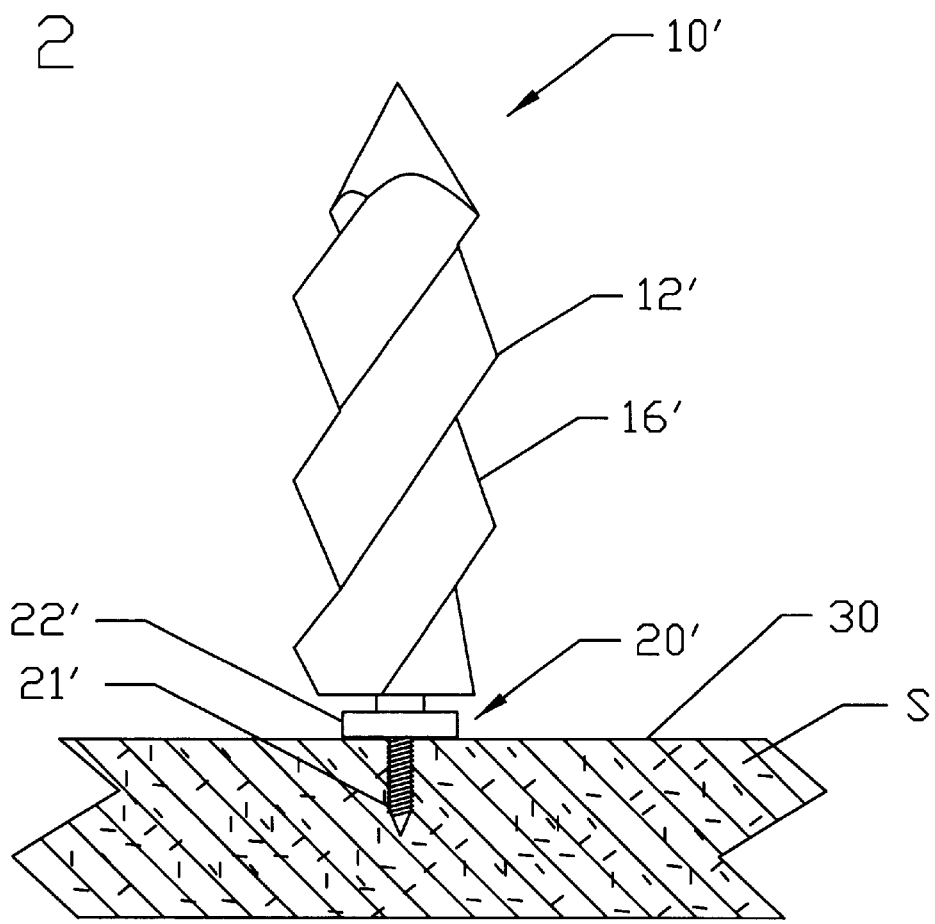

Fig. 3
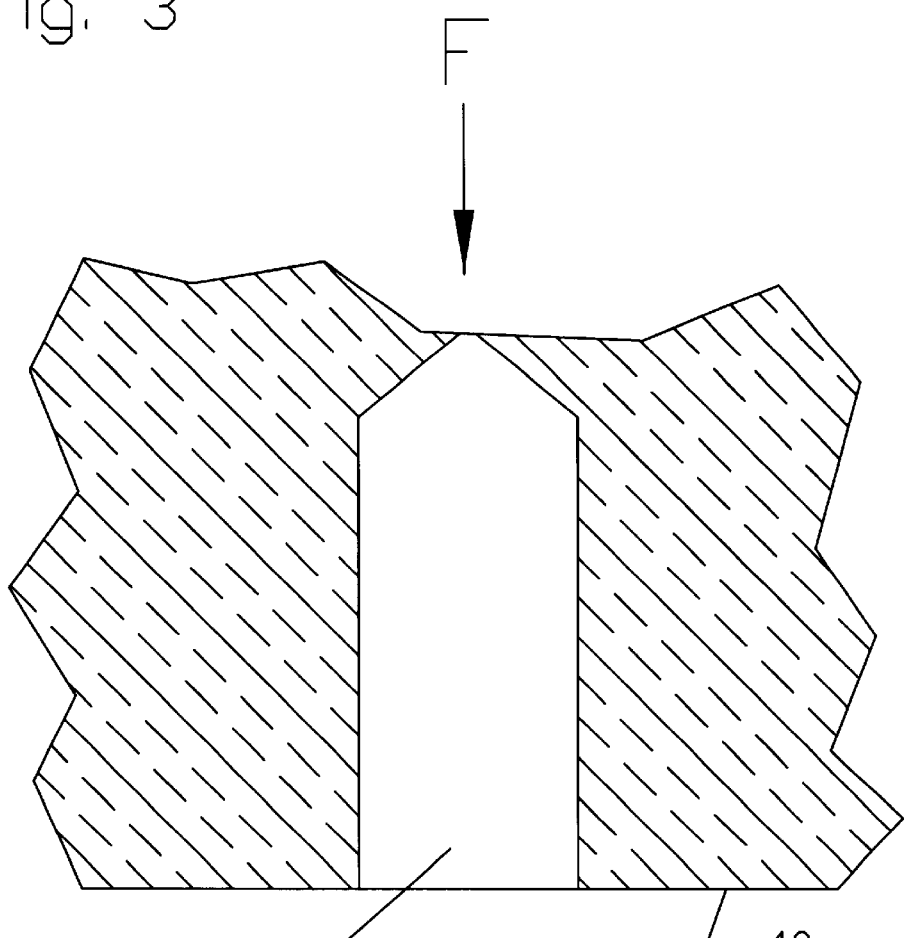
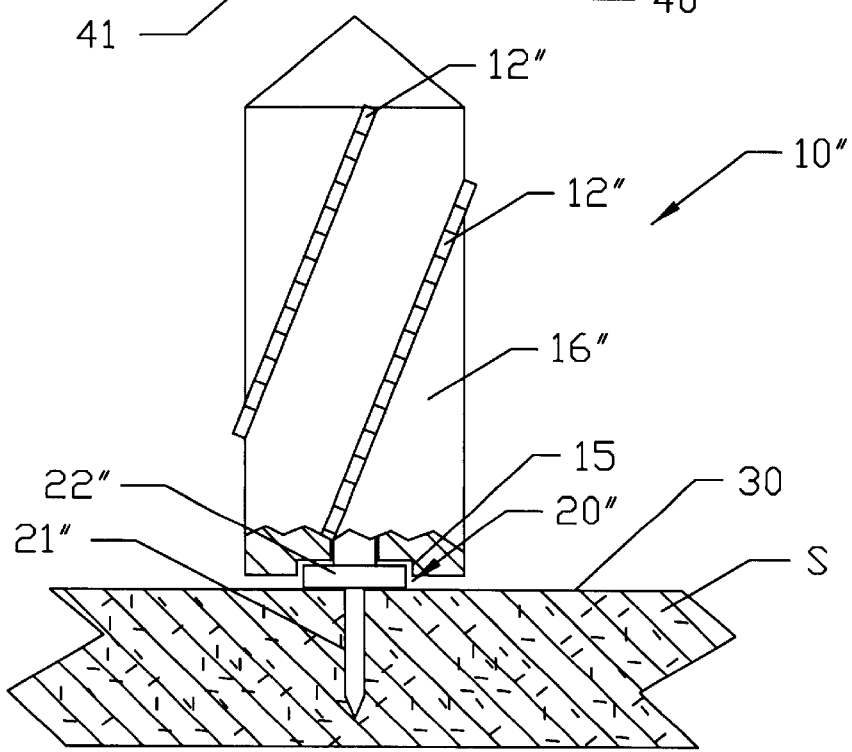

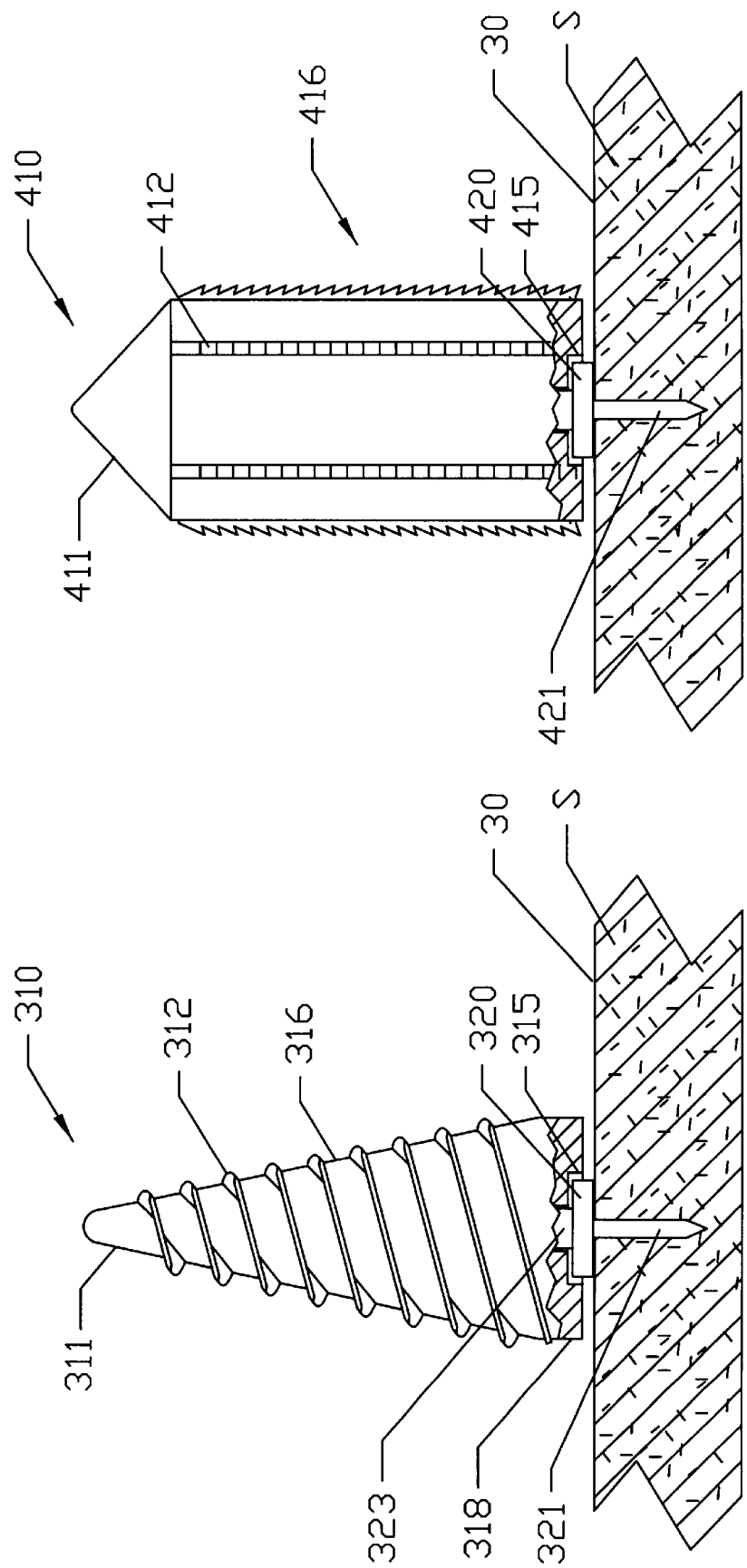

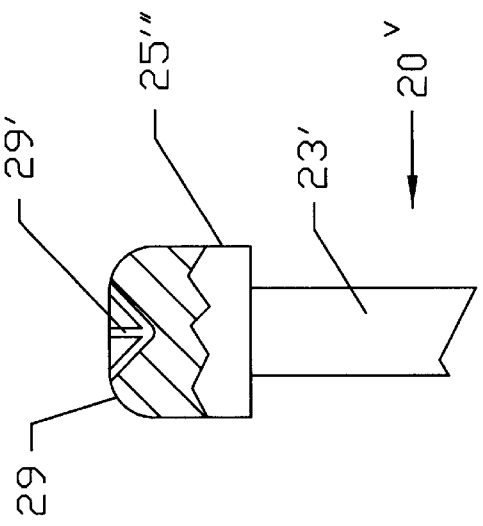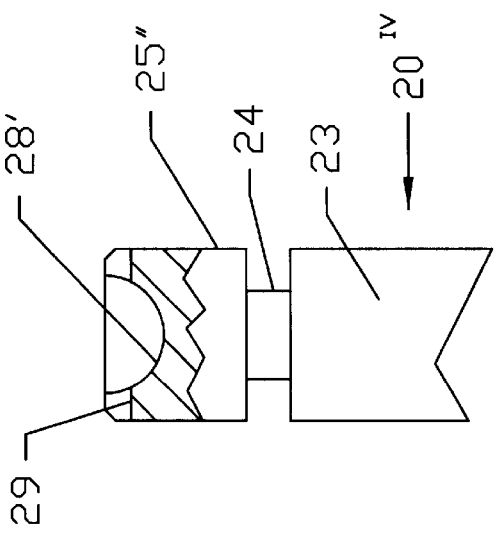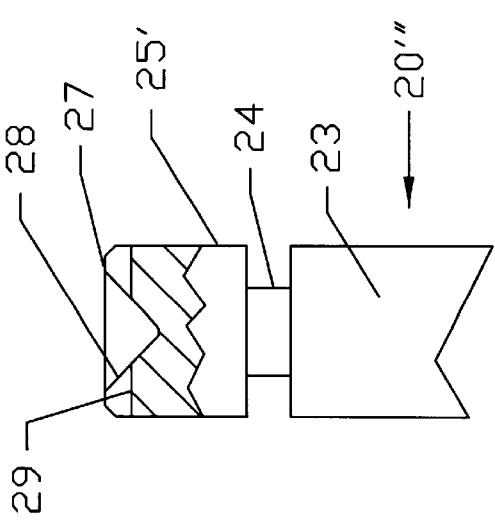

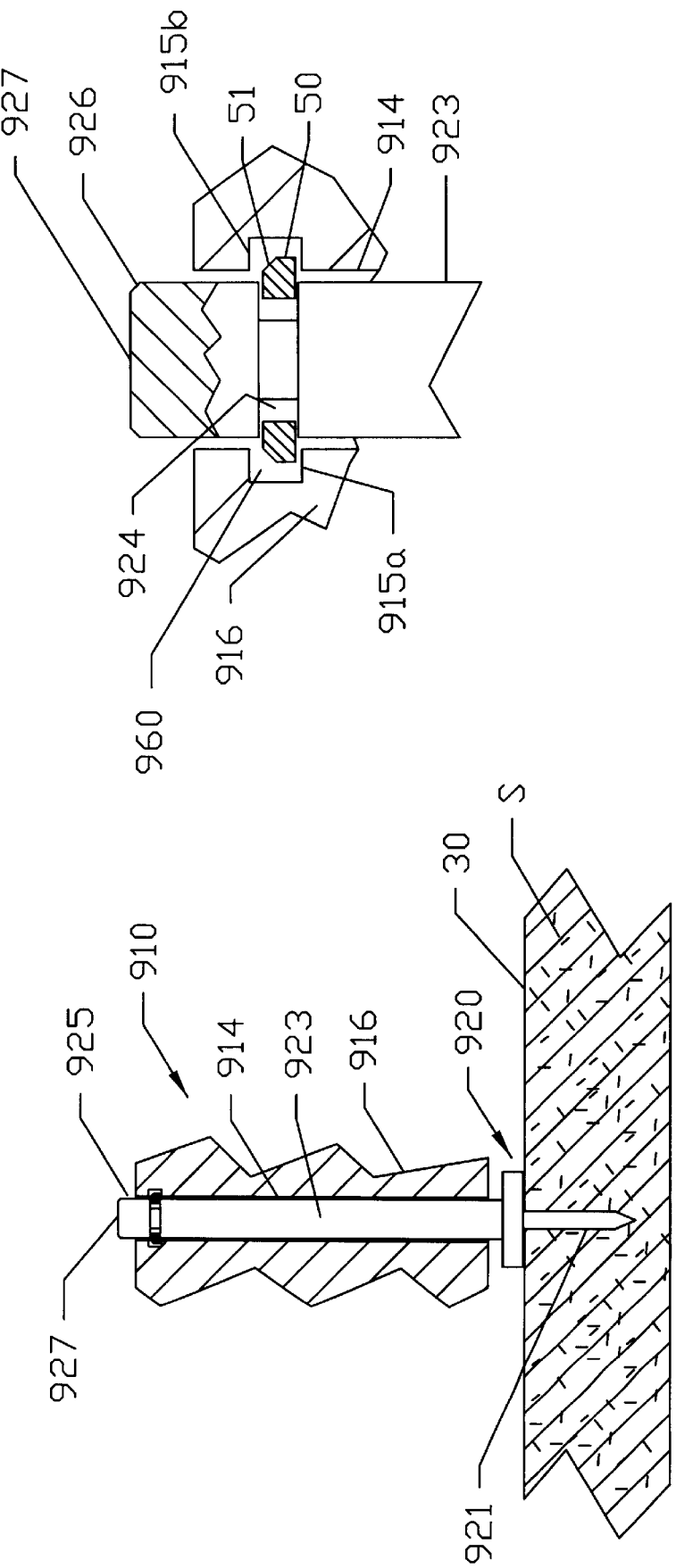

SELF-THREADING FASTENER FOR CONNECTING AN ARTICLE TO A SURFACE UPON MOVEMENT OF THE ARTICLE TOWARDS THE FASTENER

BACKGROUND OF THE INVENTION

1. Field of the Invention

The invention relates to a fastener which can be used to connect an article when the article is forced against the fastener. The fastener is particularly useful for connecting soft and/or a light-weight articles, such as a foam, wood, plastic or concrete articles, to a surface. In one embodiment of the fastener, the fastener has one end that is designed to be secured to a surface and another end to which is rotatably mounted a threaded portion whose threads are designed to cut into and/or thread into the article. In another embodiment of the fastener, the fastener has two ends with each end having rotatably mounted thereto a threaded portion whose threads are designed to cut into or thread into the articles. In still another embodiment of the fastener, the fastener is a foam window treatment fastener which has one end that is designed to be secured to an exterior surface of a building and another end to which is rotatably mounted a threaded portion whose threads are designed to cut into and/or thread into the foam window treatment.

The fastener has particular application to connecting exterior window treatments which are made from foam and thereafter coated with a mortar or cement. One such type of window treatment is disclosed in U.S. Pat. No. 5,189,856 to WINDSTRUP, the disclosure of which is expressly incorporated by reference in its entirety. Such exterior window frames or treatments give a home having the same the appearance that the home exterior is made from real or hand carved stone. However, the invention is not limited to connecting such foam articles to exterior surfaces of a buildings and may find application in other areas, including but not limited to medical, surgical, space, automobile etc.

2. Discussion of Background Information

Various types of self-threading or self-tapping fasteners are known. It is also known to utilize an axial force in order to cause the self-threading fastener to penetrate an object and/or its surface.

Thus, for example, U.S. Pat. No. 4,350,464 discloses an anchor bolt for use in concrete or masonry is described. The bolt is formed of an integral shaft having an elongate round holding portion defining a cylindrical surface with at least one helical or spiral patterned weld line along the surface. The bolt is positioned in the concrete by being forced into a hole having the same diameter as the shaft such that it rotates or turns as it is being forced into the hole due to the helical patterned weld line. The anchor bolt resists pulling from the concrete and is particularly adapted for use in holding machinery on concrete floors and in construction purposes in concrete flooring.

Additionally, U.S. Pat. No. 3,662,643 discloses a self-tapping screw insert in which the insert is specifically designed to cut its way into a relatively soft material such as aluminum, plastic or wood. The insert if forced into the material using a tool which applies an axial force to the insert in order to cause the insert to cut its way into the material.

Such fasteners, however, cannot be used fasten articles onto a static surface when an article's surface is not accessible at the time of fastening. Moreover, such fastening systems do not provide for the fastener to be self-tapping into the article and/or at the time that the article is attached to a surface. Finally, such fastening systems provide for forcing a fastener into an article surface, rather than forcing the article against that the fastener, which is may be particularly advantageous when attaching articles having blind surfaces or blind holes.

SUMMARY OF THE INVENTION

The invention therefore provides for a fastener that includes connecting member having a first end which is adapted to be secured to a static surface and a second end that is adapted to be coupled to a threaded an externally threaded member. The fastener also includes a stop surface that is adapted to engage the static surface and that is arranged between the first and second ends. The externally threaded member is rotatably mounted to the connecting member and is adapted to rotate and self-thread into an article when the article is forced against the externally threaded member.

The first end may have one of a tapered portion and an external thread. The stop may comprise one of an expanded portion and an expanded diameter portion. The stop may limit the depth that the first end penetrates into the static surface. The second end may be adapted to slide into an opening in the externally threaded member. The fastener may comprise a mechanism for axially retaining the externally threaded member in the connecting member. The second end may have an enlarged portion and a bearing surface which engages a bearing surface of the externally threaded member. The externally threaded member may have a externally tapered end. The externally threaded member may have an opening which is adapted to receive the second end of the connecting member. The opening may have at least one of a tapered portion and an enlarged portion.

The invention also provides a fastener that cuts into or self-threads into an article upon movement of the article towards the fastener, the fastener including a connecting member having a first end which is adapted to be secured to a surface and a second end, a member rotatably mounted on the connecting member and being substantially axially retained with respect to the connecting member, the member comprising at least one of an external thread, a spline and a row of teeth, and a stop surface arranged between the first end and the second end, wherein the stop surface is adapted to engage the surface, wherein, when the article is moved into engagement with the member of the fastener, the member is caused to at least one of rotate with respect to the connecting member and cut into the article.

The fastener may provide that when the article is moved into engagement with the fastener, the member each of rotates with respect to the connecting member and cuts into the article.

The member may comprise an external thread. The member may comprise a external spline. The member may comprise an external row of teeth. The stop surface may be arranged on a shoulder. The first end may comprise a penetrating nail-like tip. The first end may comprise a penetrating screw-like tip. The stop surface may be attachable to the surface via at least one of adhesives, welding, hook and loop. The member may be substantially cylindrical. The member may be substantially conical or tapered. The member may comprise an tapered end. The member may comprise an axial opening which receives the second end of the connecting member. The member may be adapted to slide onto the second end of the connecting member.

The fastener may further comprise a snap ring for axially retaining the member on the connecting member. The fastener may further comprise a one-way rotation mechanism for preventing a counter-rotation of the member after the article is installed onto the fastener.

The first end may comprise another member rotatably mounted on the connecting member and being substantially axially retained with respect to the connecting member, the other member comprising at least one of an external thread, a spline and a row of teeth, wherein, when another article is moved into engagement with the other member of the fastener, the other member is caused to at least one of rotate with respect to the connecting member and cut into the article.

The invention also provide for a fastener that cuts into an article upon movement of the article towards the fastener, the fastener comprising a connecting member having a first end which is adapted to be secured to a surface and a second end, a member that is slidable onto the second end and that is rotatable with respect to the connecting member after the member is slid onto the second end, the member thereby being substantially axially retained and rotatable with respect to the connecting member, the member comprising at least one of an external thread, a spline and a row of teeth, and a stop surface arranged between the first end and the second end, wherein the stop surface is adapted to engage the surface, wherein, when the article is forced against the fastener, the member is caused to rotate with respect to the connecting member and to cut into the article.

The invention also contemplates a method of securing an article to a surface using a fastener that cuts into or self-threads into an article upon movement of the article towards the fastener, wherein the fastener includes a connecting member having a first end which is adapted to be secured to a surface and a second end, a member rotatably mounted on the connecting member and being substantially axially retained with respect to the connecting member, the member comprising at least one of an external thread, a spline and a row of teeth, and a stop surface arranged between the first end and the second end, wherein the stop surface is adapted to engage the surface, the method comprising attaching the first end of connecting member to the surface, and moving the article towards the member, wherein, when the article is moved into engagement with the fastener, the member is caused to at least one of rotate with respect to the connecting member and cut into the article.

The method may further comprise before the moving, sliding the member onto the connecting member.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 1b shows an external side view of the embodiment shown in FIG. 1a;

FIG. 2 shows an external side view of another embodiment of the fastener. The end designed to secure the fastener to a static surface is shaped like a screw, i.e., has external threads, and penetrates a substrate up to the point where a stop shoulder engages the static surface of the substrate;

FIG. 3 shows an external side view and a partial cross-section of still another embodiment of the fastener. This figure also illustrates how the article may be forced against the fastener in order to cause the fastener to self-thread into an opening already formed in the article;

FIG. 6 shows an external side view and of a partial cross-section of still another embodiment of the fastener. In this embodiment, the externally threaded member has a tapered thread;

FIG. 7 shows an external side view and of a partial cross-section of still another embodiment of the fastener. In this embodiment, the externally threaded member has a plurality of radially projecting rows of teeth;

FIG. 11b the final position of the second end of the connecting member after it is slid into the internal opening per FIG. 11a;

FIG. 13a shows one embodiment in partial cross-section of the second end of the connecting member. This embodiment has a tapered internal bearing surface and is adapted to be rotated with a straight screw driver tip;

FIG. 13b shows one embodiment in partial cross-section of the second end of the connecting member. This embodiment has a rounded internal bearing surface and is adapted to be rotated with a straight screw driver tip;

FIG. 13c shows one embodiment in partial cross-section of the second end of the connecting member. This embodiment has a rounded external bearing surface and is adapted to be rotated with a Philips screw driver tip;

FIG. 14a shows one embodiment in cross-section of the externally threaded member. This embodiment has a tapered external bearing surface that is adapted to engage the tapered internal bearing surface shown in FIG. 13a;

FIG. 15a shows one way that a connecting member similar to that shown in FIG. 13a can be coupled to the externally threaded member shown in FIG. 14a;

FIG. 17b shows a partial cross-section side view of the teeth that are located on a bottom surface of the externally threaded member shown in FIG. 17a.

FIG. 18a shows a cross-sectional representation of another embodiment of the fastener;

FIG. 18b shows an external partial cross-section side view of the embodiment shown in FIG. 18a;

FIG. 20b shows an external side view of the embodiment shown in FIG. 20a.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice. Moreover, the various embodiments are shown having relative scale (i.e., enabling one to compare relative sizes of the various features) for the purpose of illustrating various preferred embodiments. However, the invention contemplates numerous variations in sizes as well as relative sizes of the various features.

Figure 1A:
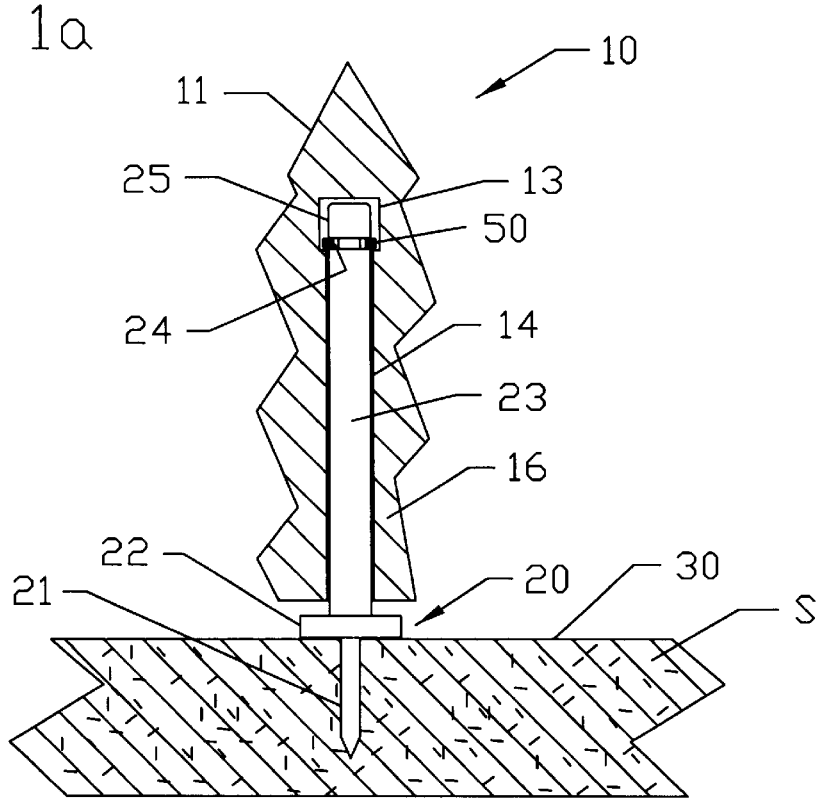
FIG. 1a shows a cross-sectional representation of one embodiment of the fastener. The end designed to secure the fastener to a static surface is shaped like a nail, and penetrates a substrate up to the point where a stop shoulder engages the static surface of the substrate.

FIG. 1a shows one embodiment of the fastener 10. The fastener 10 includes a connecting member 20 that has a first end 21 and a second end 23. The first end 21 is shaped like the end of a nail for penetrating into a surface 30. The surface 30 may be that of a substrate S such as, e.g., plywood or other type of surface, external (e.g., an outside surface of a building) or otherwise. A shoulder 22 is formed or otherwise provided on the connecting member 20. The shoulder 22 has an upper surface that faces away from the substrate S and a bottom surface which acts as a stop surface by virtue of it resting against, contacting and/or otherwise engaging substrate surface 30. The shoulder 22 may have any desired shape, e.g., circular or polygonal, and is preferably arranged near the first end 21, for the purpose of preventing and/or limiting the depth of penetration of the first end 21 into the substrate surface 30. The shoulder 22 may be a separate part (i.e., in the form of, e.g., a washer, which slides over end 21 and may also be integrally formed with the connecting member 20, as is demonstrated in, e.g., FIGS. 1a–1b.

The connecting member 20 is a solid rod-like and/or pin-like and/or shaft-like device, i.e., it has the shape of a cylindrical shaft or pin, and may be made of any convenient material, such as plastic, wood, metal, composite, etc. However, a metal such as aluminum, copper, brass, bronze, or steel is preferred since the head 25 of connecting member 20 may have to withstand significant torquing and/or hammering forces when the first end 21 is driven or otherwise forced into the surface 30 using, e.g., a hammer, screw driver, or other similar driving tool. Although not shown, the connecting member 20 may be alternatively be tubular in form in order to save weight, provided the connecting member 20 has sufficient strength to withstand its attachment and/or securement to the substrate S. As can be seen in FIG. 1a, the head 25 is arranged at an upper part of the second end 23 of the connecting member 20. As will be described later on with regard to FIGS. 13a–13c, the head 25 may have one or more surfaces which are designed to engage one or more internal surfaces of an externally threaded member 16. A groove 24 (see also e.g., FIG. 11a) is formed in the second end 23 just below the head 25. This groove 24 is designed to receive a mechanism 50 which prevents removal of the externally threaded member 16 from the connecting member 20, after the externally threaded member 16 is installed thereon. The groove 24 may be an annular snap-ring groove and the mechanism 50 which nests in the groove 50 may be a snap-ring that is made of any type and material, conventional or otherwise. However, a metal or a plastic snap ring is preferred because they are capable of expanding when being installed onto connecting member 20.

Figure 1B:
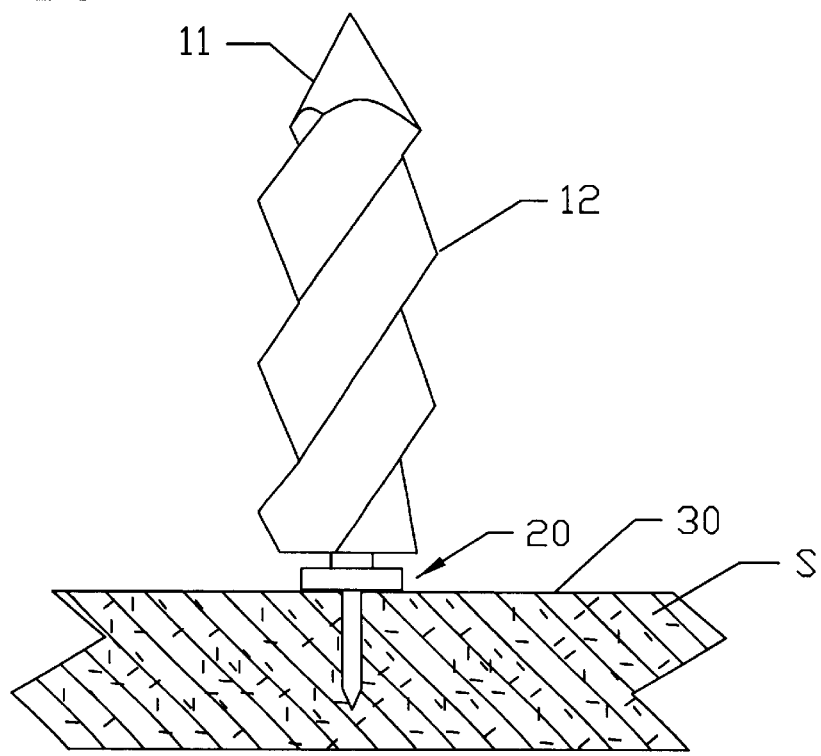

As can be seen in FIG. 1b, the externally threaded member 16 has external threads 12 and an upper tapered portion 11. These threads 12 may take the form of a variety of thread shapes and sizes, such as those of the type shown in FIG. 1b, whether conventional or otherwise, provided that such threads are capable of self-threading into an article, when the article is forced against the fastener 10 (see e.g., FIG. 3). In this regard, it should be understood that the externally threaded member 16 is designed to rotate substantially freely or otherwise, with respect to the connecting member 20 but is axially retained thereby. On the other hand, once the externally threaded member 16 is slid onto the connecting member 20, to the point wherein the snap ring 50 expands into opening 13 and otherwise prevents its removal therefrom, the axial movement of the externally threaded member 16 with respect to the connecting member 20 is relatively limited, i.e., it is limited to certain spaces or gaps between certain internal surfaces of the externally threaded member 16 and certain external surfaces of the connecting member 20 which will be described in detail with regard to FIG. 11b.

The externally threaded member 16 may have the shape of a shaft-like device, e.g., cylindrical, and includes an internal axial opening 14 which accommodates the second end 23 and some clearance between the same. The externally threaded member 16 may be made of any convenient material, such as plastic, wood, metal, composite, etc., whether conventional or otherwise. However, plastic is a preferred material when the article is, e.g., a foam article. This is because plastics are generally less expensive than other materials and because forming and/or manufacturing the externally threaded member 16 from plastic can be accomplished relatively easily by, e.g., injection molding. Moreover, it is relatively easy to choose from a number of plastics that have sufficient strength to self-thread and/or cut into foams, which are easily penetrated by the same. The external threads 12 may be of any convenient configuration, pitch and/or diameter, as long as the threads are capable of self-threading into the article material when the article is forced against the fastener 10. Thus, if the article is made of foam, a pitch of e.g., ¼ to 5 threads per inch and a diameter of between approximately ¼ inch to 2 inches may be utilized. However, it should be emphasized that the invention is not limited to any particular thread pitch, size, and/or configuration. The importance of the invention lies in the principle that the threads 12 are able to cut into and/or otherwise self-thread into the article when the article is forced against the fastener 10. Preferably, the threads 12 of the fastener 10 may be oriented and/or configured such that the externally threaded member 16 is allowed to rotate (i.e., during the connecting or self-threading into the article) between the range of 0 degrees (as in e.g., the embodiment of FIG. 7) to between approximately 30 and approximately 270 degrees (as in e.g., the embodiments of FIGS. 3–5), to one or more complete rotations of the externally threaded member 16 (as may be possible in e.g., the embodiments of FIGS. 1, 2, 6 and 8–10).

FIG. 2 shows another embodiment of the fastener 10' similar to that shown in FIGS. 1a–b, with like features (not all of which are shown in this figure) being described with reference numbers having an ('). The fastener 10' includes a connecting member 20' that has a first end 21' and a second end similar to that shown in FIG. 1a. Unlike the embodiment shown in FIGS. 1a–1b which uses a nail-like first end 21, this embodiment uses a first end 21' that is shaped like the end of a screw (i.e., it is externally threaded) for penetrating into a surface 30. As with the previous embodiment, the surface 30 may be that of a substrate S such as, e.g., plywood or other type of surface, whether external or otherwise. A shoulder 22' having a stop or stop surface is similarly provided in the area of the first end 21' for the purpose of preventing and/or limiting the depth of penetration of the first end 21' into the substrate surface 30. The connecting member 20' is otherwise similar to that shown in FIG. 1a, i.e., it is a solid rod-like and/or pin-like device, and may have the shape of a shaft or pin and may be made of any convenient material, such as plastic, wood, metal, composite, etc. However, steel is preferred since the head may have to withstand significant torquing forces when the first end 21' is screwed into the substrate using a screw driver or other similar rotatable driving tool. Although not shown, connecting member 20' may also be tubular in order to save weight, provided it has sufficient strength to withstand its attachment to the substrate S by torquing. As is apparent from FIG. 2, this embodiment differs from that of FIG. 1a mainly with regard to the first end 21'. Accordingly, the internal features of the externally threaded member 16' as well as other features of the connecting member 20' will not be described again.

As in the embodiment shown in FIGS. 1a–1b, in the embodiment shown in FIG. 2, the externally threaded member 16' has external threads 12'. Again, these threads may take the form of a variety of thread shapes and sizes, such as those of the type shown, whether conventional or otherwise, provided such threads 12 are capable of self-threading into an article, when the article is forced against the fastener 10'. Again, as this embodiment differs from that of FIG. 1a mainly with regard to the first end 21', the description regarding how the externally threaded member 16' is connected and/or otherwise assembled to the connecting member 20' as well as the rotatably mounting of the externally threaded member 16' on the connecting member 20' will not be described again.

FIG. 3 shows another embodiment of the fastener 10" similar to that shown in FIGS. 1a–b, with like features (not all of which are shown in this figure) being described with reference numbers having an ("). The fastener 10" includes a connecting member 20" that has a first end 21" and a second end 23" (not shown). As with the embodiment shown in FIGS. 1a–1b, the first end 21" is shaped like the end of a nail for penetrating into a surface 30. Although not shown, the first end 21" may alternatively be formed like that shown in FIG. 2 as well, i.e., a screw end instead of a nail end. As with the embodiment of FIGS. 1a–1b, the surface 30 may be that of a substrate S such as, e.g., plywood or other type of surface, whether external or otherwise. A shoulder 22" having a stop is similarly provided in the area of the first end 21" for the purpose of preventing and/or limiting the depth of penetration of the first end 21" into the substrate surface 30. The connecting member 20" is otherwise similar that shown in FIG. 1a.

As in the previous embodiments, in the embodiment shown in FIG. 3, the externally threaded member 16" can be a cylindrical body which has external threads 12". However, the threads 12" in this embodiment differ from those shown in FIGS. 1a–b in that they are formed as raised portions or rows of teeth which extend from a cylindrical surface. However, as with the previous embodiments, these threads 12" may take the form of a variety of thread shapes and sizes, such as those of the type shown, whether conventional or otherwise, provided such threads are capable of self-threading and/or cutting into an opening 41 that is already formed in an article 40, when the article 40 is forced against the fastener 10". In this regard, it should be understood that, as with the previous embodiments, the externally threaded member 16" is designed to rotate substantially freely or otherwise with respect to the connecting member 20", so as to be able to thread and/or cut into opening 41. The externally threaded member 16" of this embodiment includes a counterbore 15 which sized to accept at least a portion of the shoulder 22" in addition to some clearance, otherwise its internal construction is similar that shown in FIG. 1a. Again, as this embodiment differs from that of FIG. 1a mainly with regard to the counterbore 15 and the external configuration of the externally threaded member 16", the description regarding how the externally threaded member 16" is connected and/or otherwise assembled to the connecting member 20", as well as the rotatably mounting of the externally threaded member 16" onto the connecting member 20" will not be described again.

As can be discerned from FIG. 3, the fastener 10" (and in a similar manner fasteners 10 and 10') is designed to secure an article 40 to a surface 30. One way to accomplish this is to first attach the fastener to the surface 30 and thereafter force the article 40 against the fastener 10" and/or against the surface 30. This can be accomplished by first attaching the connecting member 20" to the surface 30 using either a hammer or screw driver, in order to position the first end 21" securely into the substrate S, up to the point where the shoulder 22" contacts the surface 30. Then, the externally threaded member 16" can be slid onto the connecting member 20" (see e.g., FIGS. 11a–11b), until it snaps into place and/or is otherwise axially retained thereby. Finally, the article 40, having an opening 41 already formed therein, is forced against the fastener 10", whereby the externally threaded member 16" is caused to rotate as it threads or cuts its way into the opening 41. Full connection is achieved when the article 40 surface rests against or is otherwise positioned adjacent to the surface 30. Of course, if the article 40 is to be attached at more than one point, as will typically be the case, a fastener can be provided and/or utilized for each opening 41 that is provided in the article 40.

Figure 20A:
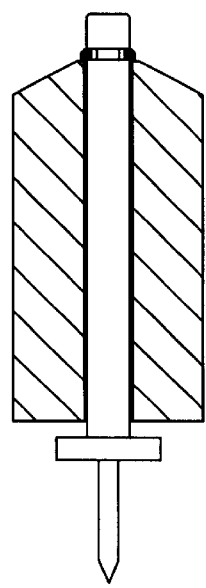
FIG. 20a shows a cross-sectional representation of still another embodiment of the fastener. The fastener is designed to be secured to a static surface with the externally threaded member already installed thereon.
Figure 20B:
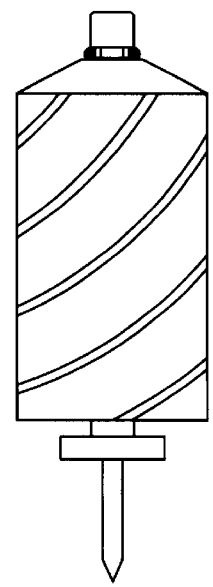

Although not shown, the invention also contemplates an even simpler way to use the fastener in which only two steps are required to attach the article to the surface 30 (see also e.g., FIGS. 20a–b). First the fastener 10" is attached to the surface 30 in a single step and thereafter the article 40 is forces against the fastener 10" and/or against the surface 30. This can be accomplished by first attaching the connecting member 20" with the already installed external threading member 16" onto the surface 30 using either a hammer or screw driver, in order to position the first end 21" into the substrate, until the shoulder 22" contacts the surface 30. Then, the article 40, having an opening 41 already formed therein, is forced against the fastener, whereby the externally threaded member 16" is caused to rotate as it threads or cuts its way into the opening 41. Full connection is achieved when the article surface 40 rests against or is otherwise positioned adjacent to surface 30. Of course, if the article 40 is to be attached at more than one point, as will typically be the case, a fastener 10" for each opening can be provided and/or utilized. The embodiment shown in FIGS. 18a–18b and FIGS. 20a and 20b illustrate how the fastener could be modified so as to be installed in this way.

It should also be noted that the invention contemplates a fastener of the type which does not require that the article 40 has one or more already formed openings 41. In the regard, the fastener may be designed with an externally threaded member which can cut into the article 40 which does not have preformed openings 41, i.e., using an externally threaded member which can self-thread into the article 40 even if the article has no preformed openings. FIG. 6 illustrates an embodiment which can be used in this way. Although not shown, in any of the embodiments disclosed herein, the connection may also be enhanced by additionally using adhesives between the article 40 surface and the substrate surface 30, as well as between the externally threaded member 16, 16' and 16" and the opening 41.

Figure 4:
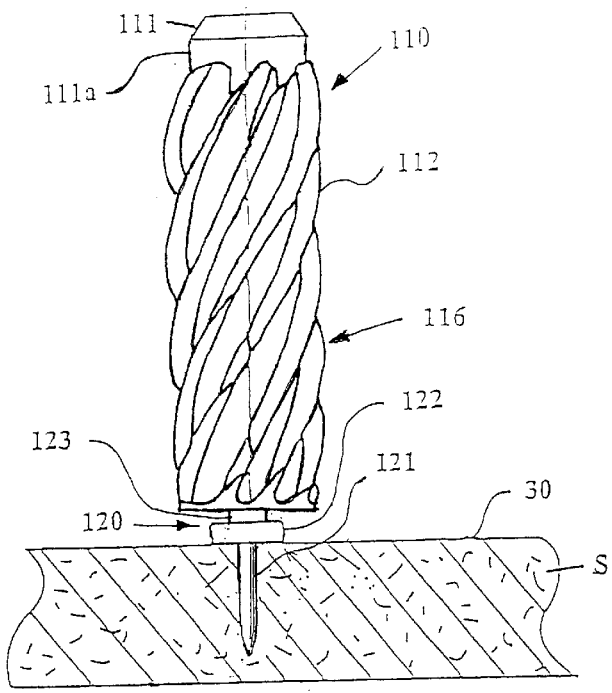
FIG. 4 shows an external side view of still another embodiment of the fastener. In this embodiment, the externally threaded member has fluted spiral teeth or threads.

FIG. 4 shows another embodiment of the fastener 110 similar to that shown in FIGS. 1a–b, with like features (not all of which are shown in this figure) being described with reference numbers being raised by 100. The fastener 110 includes a connecting member 120 that has a first end 121 and a second end 123 similar to the one shown in FIG. 1a. The first end 121 is shaped like the end of a nail for penetrating into a surface 30. Although not shown, the first end 121 may alternatively be formed like that shown in FIG. 2 as well, i.e., a screw end instead of a nail end. As with the embodiment of FIGS. 1a–1b, the surface 30 may be that of a substrate S such as, e.g., plywood or other type of surface, whether external or otherwise. A shoulder 122 having a stop surface is similarly provided in the area of the first end 121 for the purpose of preventing and/or limiting the depth of penetration of the first end 121 into the substrate surface 30. The connecting member 120 is otherwise similar that shown in FIG. 1a.

As in many of the previous embodiments, in the embodiment shown in FIG. 4, the externally threaded member 116 has external threads 112. However, the threads 112 in this embodiment differ in that they are formed like that of a multi fluted spiral milling cutter whose threads or cutting teeth may or may not begin some distance from a tapered end 111, and which includes a cylindrical section 111a arranged between the tapered end 111 and the beginning of the threads 112. However, as with the previous embodiments, these threads 112 may take the form of a variety of thread shapes and sizes, such as those of the type shown, whether conventional or otherwise, provided such threads are capable of self-threading and/or cutting into an opening that is already formed in an article, when the article is forced against the fastener 110. In this regard, it should be understood that, as with the previous embodiments, the externally threaded member 116 is designed to rotate substantially freely or otherwise, with respect to the connecting member 120, so as to be able to thread into an opening and/or into the article (not shown). The externally threaded member 116 and the connecting member 120 of this embodiment are otherwise similar that shown in FIG. 1a in the manner of their connection to each other. Again, as this embodiment differs from that of FIG. 1a mainly with regard to the external configuration of the externally threaded member 116, the description regarding how the externally threaded member 116 is connected and/or otherwise assembled to the connecting member 120, as well as the rotatable mounting of the externally threaded member 116 onto the connecting member 120 will not be described again.

Figure 5:
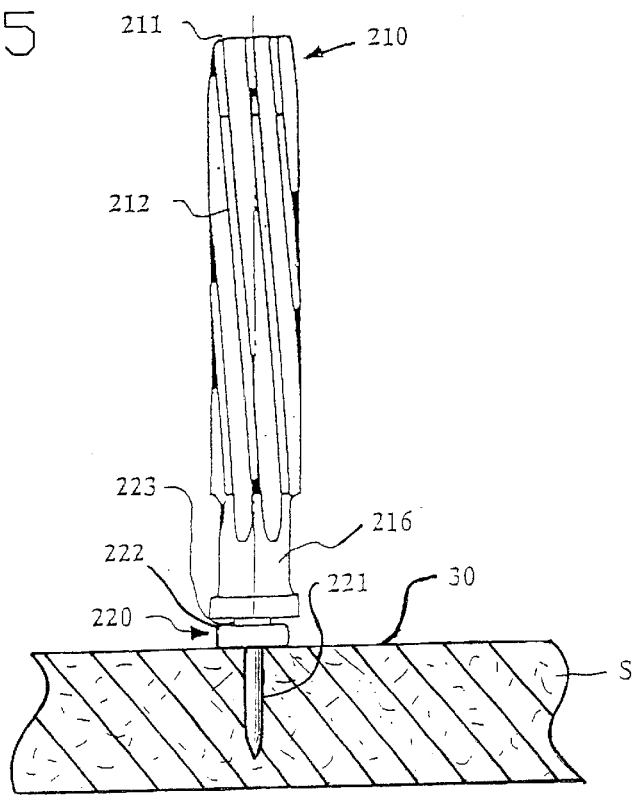
FIG. 5 shows an external side view of still another embodiment of the fastener. In this embodiment, the externally threaded member has reamer-like teeth or flutes.

FIG. 5 shows another embodiment of the fastener 210 similar to that shown in FIGS. 1a–b, with like features (not all of which are shown in this figure) being described with reference numbers being raised by 200. The fastener 210 includes a connecting member 220 that has a first end 221 and a second end 223 similar to the one shown in FIG. 1a. The first end 221 is shaped like the end of a nail for penetrating into a surface 30. Although not shown, the first end 221 may alternatively be formed like that shown in FIG. 2 as well, i.e., a screw end instead of a nail end. As with the embodiment of FIGS. 1a–1b, the surface 30 may be that of a substrate S such as, e.g., plywood or other type of surface, whether external or otherwise. A shoulder 222 having a stop surface is similarly provided in the area of the first end 221 for the purpose of preventing and/or limiting the depth of penetration of the first end 221 into the substrate surface 30. The connecting member 220 is otherwise similar that shown in FIG. 1a.

As in the previous embodiments, in the embodiment shown in FIG. 5, the externally threaded member 216 has external threads 212. However, the threads 212 in this embodiment differ in that they are formed like that of a multi fluted reamer which threads may or may not begin at the blunt end 211. However, as with the previous embodiments, these threads 212 may take the form of a variety of thread shapes and sizes such as those of the type shown, whether conventional or otherwise, provided such threads are capable of self-threading and/or cutting into an opening that is already formed in an article, when the article is forced against the fastener 210. In this regard, it should be understood that, as with the previous embodiments, the externally threaded member 216 is designed to rotate substantially freely or otherwise with respect to the connecting member 220, so as to be able to thread and/or cut into an opening and/or into the article (not shown). The externally threaded member 216 and the connecting member 220 of this embodiment are otherwise similar that shown in FIG. 1a, in the manner of their connection to each other. Again, as this embodiment differs from that of FIG. 1a mainly with regard to the external configuration of the externally threaded member 216, the description regarding how the externally threaded member 216 is connected and/or otherwise assembled to the connecting member 220, as well as the rotatable mounting of the externally threaded member 216 onto the connecting member 220 will not be described again.

FIG. 6 shows another embodiment of the fastener 310 similar to that shown in FIGS. 1a–b, with like features (not all of which are shown in this figure) being described with reference numbers being increased by 300. The fastener 310 includes a connecting member 320 that has a first end 321 and a second end 323. As with the embodiment shown in FIGS. 1a–1b, the first end 321 is shaped like the end of a nail for penetrating into a surface 30. Although not shown, the first end 321 may alternatively be formed like that shown in FIG. 2 as well, i.e., a screw end instead of a nail end. As with the embodiment of FIGS. 1a–1b, the surface 30 may be that of a substrate S such as, e.g., plywood or other type of surface, whether external or otherwise. A shoulder having a stop surface is similarly provided in the area of the first end 321 for the purpose of preventing and/or limiting the depth of penetration of the first end 321 into the substrate surface 30. The connecting member 320 is otherwise similar that shown in FIG. 1a.

As in some of the previous embodiments, in the embodiment shown in FIG. 6, the externally threaded member 316 has an external thread 312 and a tapered end 311. However, the thread 312 in this embodiment differs in that it is formed as a single raised narrow spiral blade which extends from a tapered conical surface of externally threaded member 316. However, as with the previous embodiments, this thread 312 may take the form of a variety of thread shapes and sizes such as those of the type shown, whether conventional or otherwise, provided such threads are capable of self-threading into an article whether the article has an already formed opening or not, when the article is forced against the fastener 310. In this regard, it should be understood that, as with the previous embodiments, the externally threaded member 316 is designed to rotate substantially freely or otherwise with respect to the connecting member 320, so as to be able to thread and/or cut into the article. The externally threaded member 316 of this embodiment also includes a counterbore 315, similar to that shown in the embodiment of FIG. 3, which sized to accept at least a portion of the shoulder along with a clearance, otherwise its internal construction is similar that shown in FIG. 1a. Again, as this embodiment differs from that of FIG. 1a mainly with regard to the counterbore 315 and the external configuration of the externally threaded member 316, the description regarding how the externally threaded member 316 is connected and/or otherwise assembled to the connecting member 320, as well as the rotatable mounting of the externally threaded member 316 onto the connecting member 320 will not be described again.

FIG. 7 shows another embodiment of the fastener 410 similar to that shown in FIGS. 1a–b, with like features (not all of which are shown in this figure) being described with reference numbers being increased by 400. The fastener 410 includes a connecting member 420 that has a first end 421 and a second end 423. As with the embodiment shown in FIGS. 1a–1b, the first end 421 is shaped like the end of a nail for penetrating into a surface 30. Although not shown, the first end 421 may alternatively be formed like that shown in FIG. 2 as well, i.e., a screw end instead of a nail end. As with the embodiment of FIGS. 1a–1b, the surface 30 may be that of a substrate S such as, e.g., plywood or other type of surface, whether external or otherwise. A shoulder having a stop surface is similarly provided in the area of the first end 421 for the purpose of preventing and/or limiting the depth of penetration of the first end 421 into the substrate surface 30. The connecting member 420 is otherwise similar that shown in FIG. 1a.

As in some of the previous embodiments, in the embodiment shown in FIG. 7, the externally threaded member 416 has external threads or rows of teeth 412 and a tapered end 411. However, the threads or flutes 412 in this embodiment differ in that they are formed as radially oriented parallel saw-like cutting projections which extend from a cylindrical surface of the externally threaded member 316. However, as with the previous embodiments, these threads 412 may take the form of a variety of thread shapes and sizes such as those of the type shown, whether conventional or otherwise, provided such threads are capable of self-threading into an article whether it has an already formed opening or not, when the article is forced against the fastener 410. In this regard, it should be understood that, as with the previous embodiments, the externally threaded member 416 is designed to rotate substantially freely or otherwise with respect to the connecting member 420, even though such rotation will generally not occur when the article is forced against the fastener 410. The externally threaded member 416 of this embodiment also includes a counterbore 415, similar to that shown in the embodiment of FIGS. 3 and 6, which sized to accept at least a portion of the shoulder, otherwise its internal construction is similar that shown in FIG. 1a. Again, as this embodiment differs from that of FIG. 1a mainly with regard to the counterbore 415 and the external configuration of the externally threaded member 416, the description regarding how the externally threaded member 416 is connected and/or otherwise assembled to the connecting member 420, as well as the rotatable mounting of the externally threaded member 416 onto the connecting member 420 will not be described again.

Figure 8:
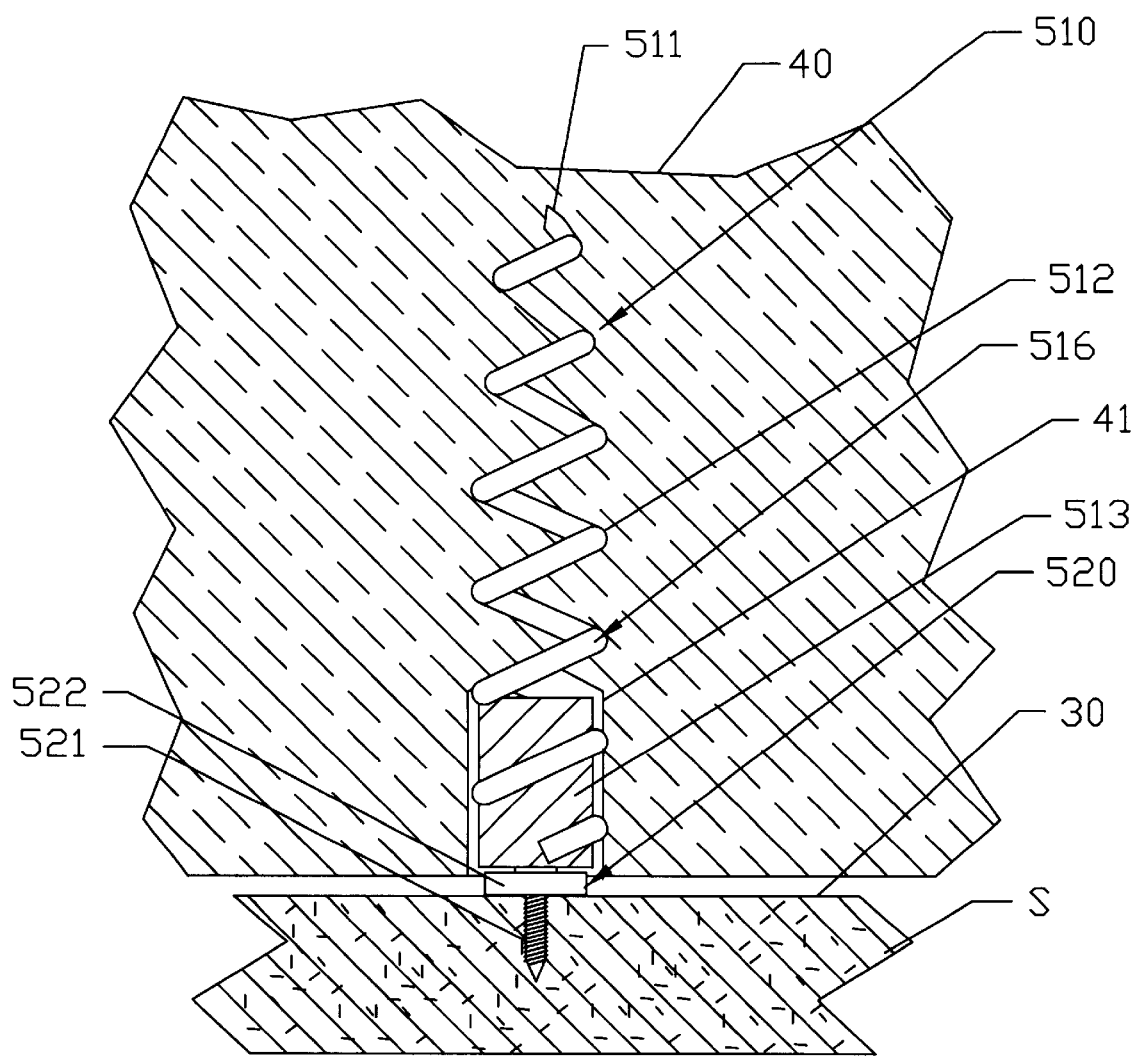
FIG. 8 shows an external side view and of a partial cross-section of still another embodiment of the fastener. In this embodiment, the externally threaded member has a single wire thread.

FIG. 8 shows another embodiment of the fastener 510 similar to that shown in FIGS. 1a–b, with like features (not all of which are shown in this figure) being described with reference numbers being raised by 500. The fastener 510 includes a connecting member 520 that has a first end 521 and a second end. The first end 521 is shaped like the end of a screw for penetrating into a surface 30. Although not shown, the first end 521 may alternatively be formed like that shown in FIG. 1a, as well, i.e., a nail end instead of a screw end. As with the embodiment of FIGS. 1a–1b, the surface 30 may be that of a substrate S such as, e.g., plywood or other type of surface, whether external or otherwise. A shoulder 522 having a stop surface is similarly provided in the area of the first end 521 for the purpose of preventing and/or limiting the depth of penetration of the first end 521 into the substrate surface 30. The connecting member 520 is otherwise similar that shown in FIG. 1a.

In the embodiment shown in FIG. 8, the externally threaded member 516 includes an attached external wire thread 512 which is in the form of a spiral twisted wire having a sharp end 511. This twisted wire 512 has one end attached to a body 513 which, together, form the externally threaded member 516. As is evident from the drawing, the twisted wire thread 512 is capable of self-threading into the article 40 after passing through a shallow opening 41 already formed in an article 40, when the article 40 is forced against the fastener 510. In this regard, it should be understood that the externally threaded member 516 (i.e., both 512 and 513 is designed to rotate substantially freely or otherwise with respect to the connecting member 520. The body portion 513 of externally threaded member 516, as with the previous embodiments, is designed to rotate substantially freely or otherwise with respect to the connecting member 520, especially when such rotation occurs when the article 40 is forced against the fastener 510. The externally threaded member 516 of this embodiment otherwise uses an internal construction that is similar that shown in FIG. 1a. Again, as this embodiment differs from that of FIG. 1a mainly with regard to the external configuration of the externally threaded member 516, the description regarding how the externally threaded member 516 is connected and/or otherwise assembled to the connecting member 520, as well as the rotatable mounting of the externally threaded member 516 onto the connecting member 520 will not be described again.

Figure 9:
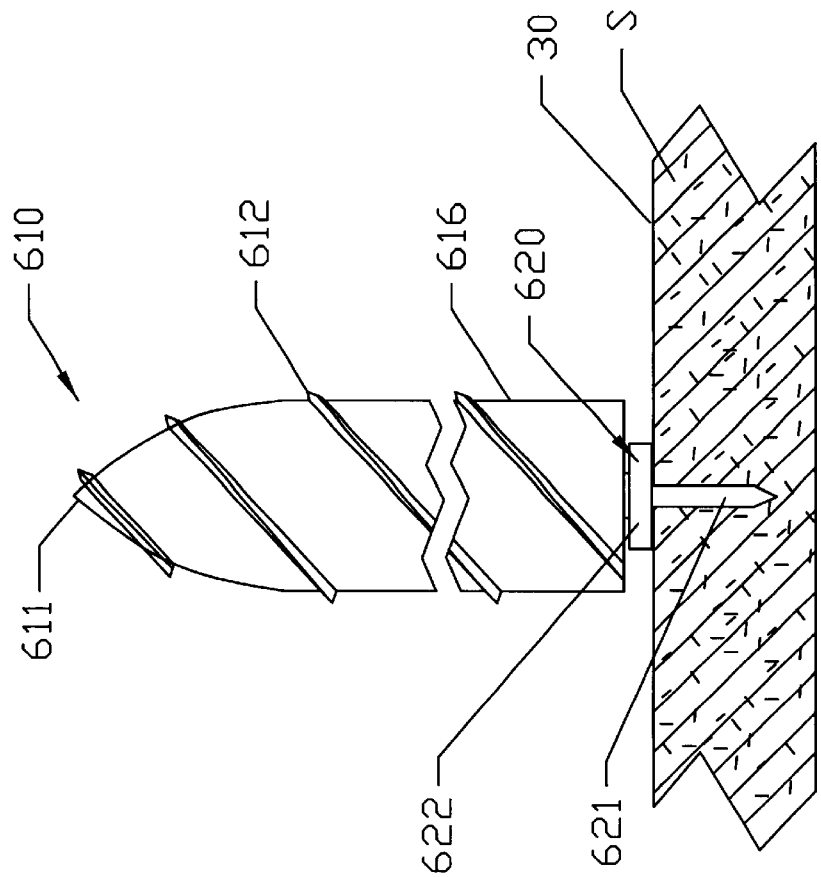
FIG. 9 shows an external side view of still another embodiment of the fastener. In this embodiment, the externally threaded member has a single coarse thread which begins at its tapered tip.

FIG. 9 shows another embodiment of the fastener 610 similar to that shown in FIGS. 1a–b, with like features (not all of which are shown in this figure) being described with reference numbers being raised by 600. The fastener 610 includes a connecting member 620 that has a first end 621 and a second end similar to the one shown in FIG. 1a. The first end 621 is shaped like the end of a nail for penetrating into a surface 30. Although not shown, the first end 621 may alternatively be formed like that shown in FIG. 2 as well, i.e., a screw end instead of a nail end. As with the embodiment of FIGS. 1a–1b, the surface 30 may be that of a substrate S such as, e.g., plywood or other type of surface, whether external or otherwise. A shoulder 622 having a stop surface is similarly provided in the area of the first end 621 for the purpose of preventing and/or limiting the depth of penetration of the first end 621 into the substrate surface 30. The connecting member 620 is otherwise similar that shown in FIG. 1a.

As in many of the previous embodiments, in the embodiment shown in FIG. 9, the externally threaded member 616 has an external thread 612. However, the threads 612 in this embodiment differ in that they are formed like that is a tooth on a file which may or may not begin some distance from a tapered end 611, and which includes a cylindrical section arranged some distance from the tapered end 611. However, as with the previous embodiments, this thread 612 may take the form of a variety of thread shapes and sizes such as those of the type shown, whether conventional or otherwise, provided such thread is capable of self-threading into an opening that is already formed in an article, when the article is forced against the fastener 610. In this regard, it should be understood that, as with the previous embodiments, the externally threaded member 616 is designed to rotate substantially freely or otherwise, with respect to the connecting member 620, so as to be able to thread into an opening in the article and/or into the article (not shown). The externally threaded member 616 and the connecting member 620 of this embodiment is otherwise similar that shown in FIG. 1a. Again, as this embodiment differs from that of FIG. 1a mainly with regard to the external configuration of the externally threaded member 616, the description regarding how the externally threaded member 616 is connected and/or otherwise assembled to the connecting member 620, as well as the rotatable mounting of the externally threaded member 616 onto the connecting member 620 will not be described again.

Figure 10:
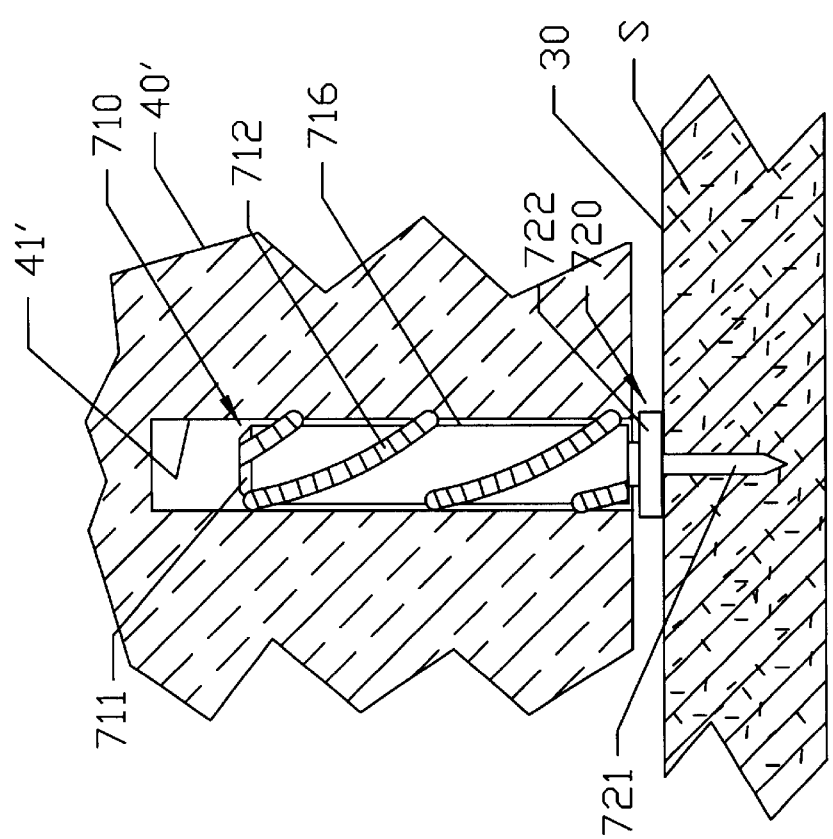
FIG. 10 shows an external side view of still another embodiment of the fastener. This figure also illustrates a concrete article that has already been forced against the fastener and that is secured thereby. In this embodiment, the externally threaded member has a plurality of diamond impregnated spiral threads.

In the embodiment shown in FIG. 10, unlike the previous embodiments, a fastener 710 is provided that is designed to be used with articles which are made of a material other than foam, wood or plastic, e.g., fastener 710 is specifically designed for use with articles which are made of mortar, cement or concrete. The fastener 710 has an externally threaded member 716 with external threads 712. However, the threads 712 in this embodiment differ from those of the previous embodiments in that they are formed as raised hard portions (e.g., portions which include and/or are impregnated with industrial diamond chips or sections) which extend from a cylindrical surface 716. However, as with the previous embodiments, these threads 712 may take the form of a variety of thread shapes and sizes such as those of the type shown, whether conventional or otherwise, provided such threads are capable of self-threading into an opening 41' that is already formed in the cement article 40', when the article 40' is forced against the fastener 710. It should be understood that, as with the previous embodiments, the externally threaded member 716 is designed to rotate substantially freely or otherwise with respect to the connecting member 720, so as to be able to thread into opening 41'. Again, as this embodiment differs from that of FIG. 1a mainly with regard to the external configuration of the externally threaded member 716, the description regarding how the externally threaded member 716 is connected and/or otherwise assembled to the connecting member 720, as well as the rotatably mounting of the externally threaded member 716 onto the connecting member 720 will not be described again.

As was the case with the previous embodiments, the fastener 710 shown in FIG. 10 is designed to secure an article 40' to a surface 30. One way to accomplish this is to first attach the fastener 710 to the surface 30 and thereafter force the cement article 40' against the fastener 710 and/or against the surface 30. This can be accomplished by first attaching the connecting member 720 to the surface 30 using e.g., a hammer or screw driver, in order to position the first end 721 into the substrate S, until the shoulder 722 contacts the surface 30. Then, the externally threaded member 716 can be slid onto the connecting member 720 (see e.g., FIGS. 11a–11b), until it snaps into place or is otherwise axially retained thereby. Finally, the cement article 40', having an opening 41' already formed therein, is forced against the fastener 710, whereby the externally threaded portion is caused to rotate as it threads or cuts its way into the opening 41'. Full connection is achieved when the cement article 40' rests or abuts against or is otherwise positioned adjacent to surface 30. Of course, if the cement article 40' is to be attached at more than one point, as will typically be the case, a fastener 710 for each opening can be provided and/or utilized.

Figure 11A:
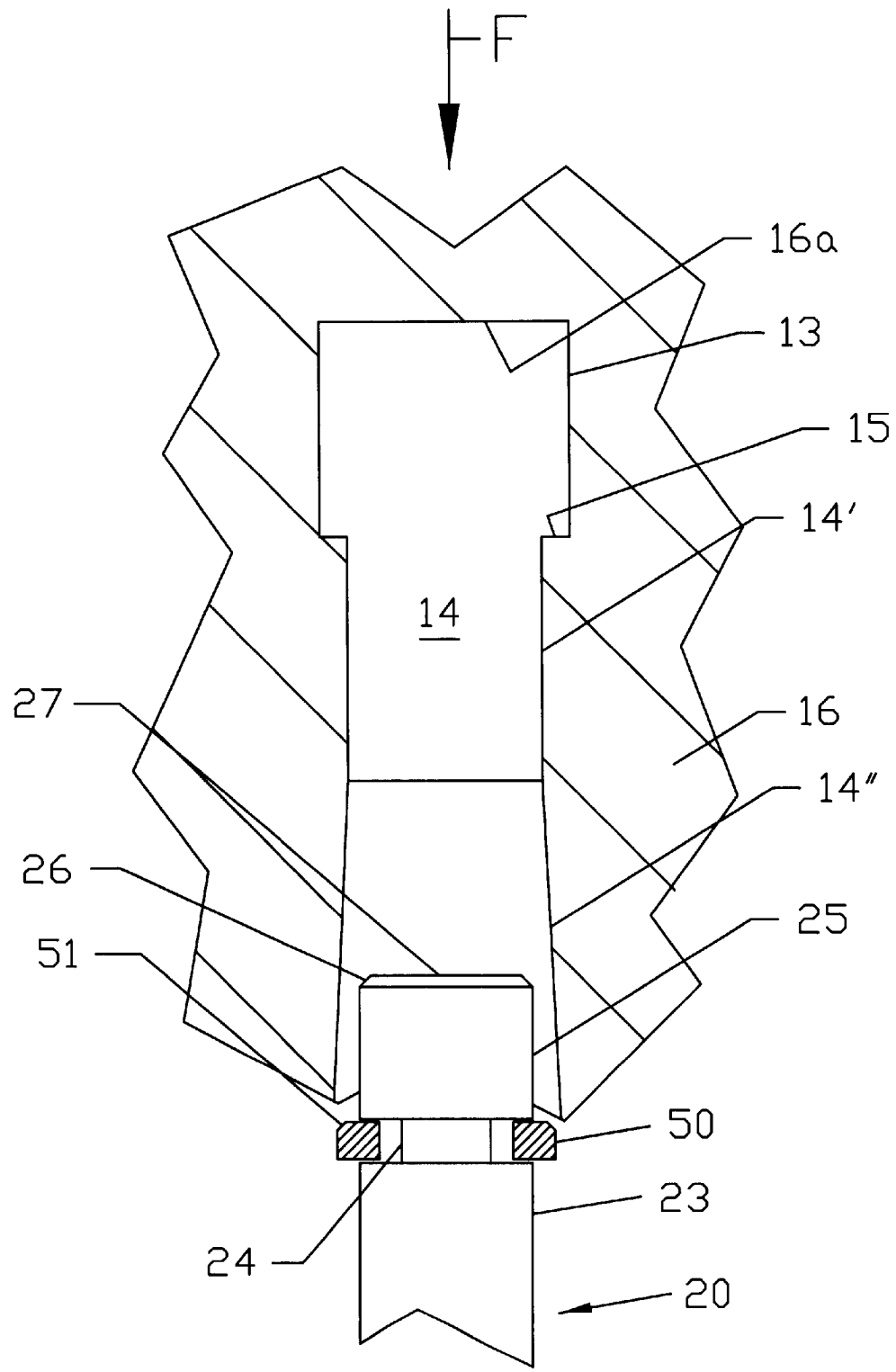
FIG. 11a shows a cross-section of the externally threaded member and illustrates the internal opening therein and how the second end of the connecting member can be slid into the internal opening.
Figure 11B:
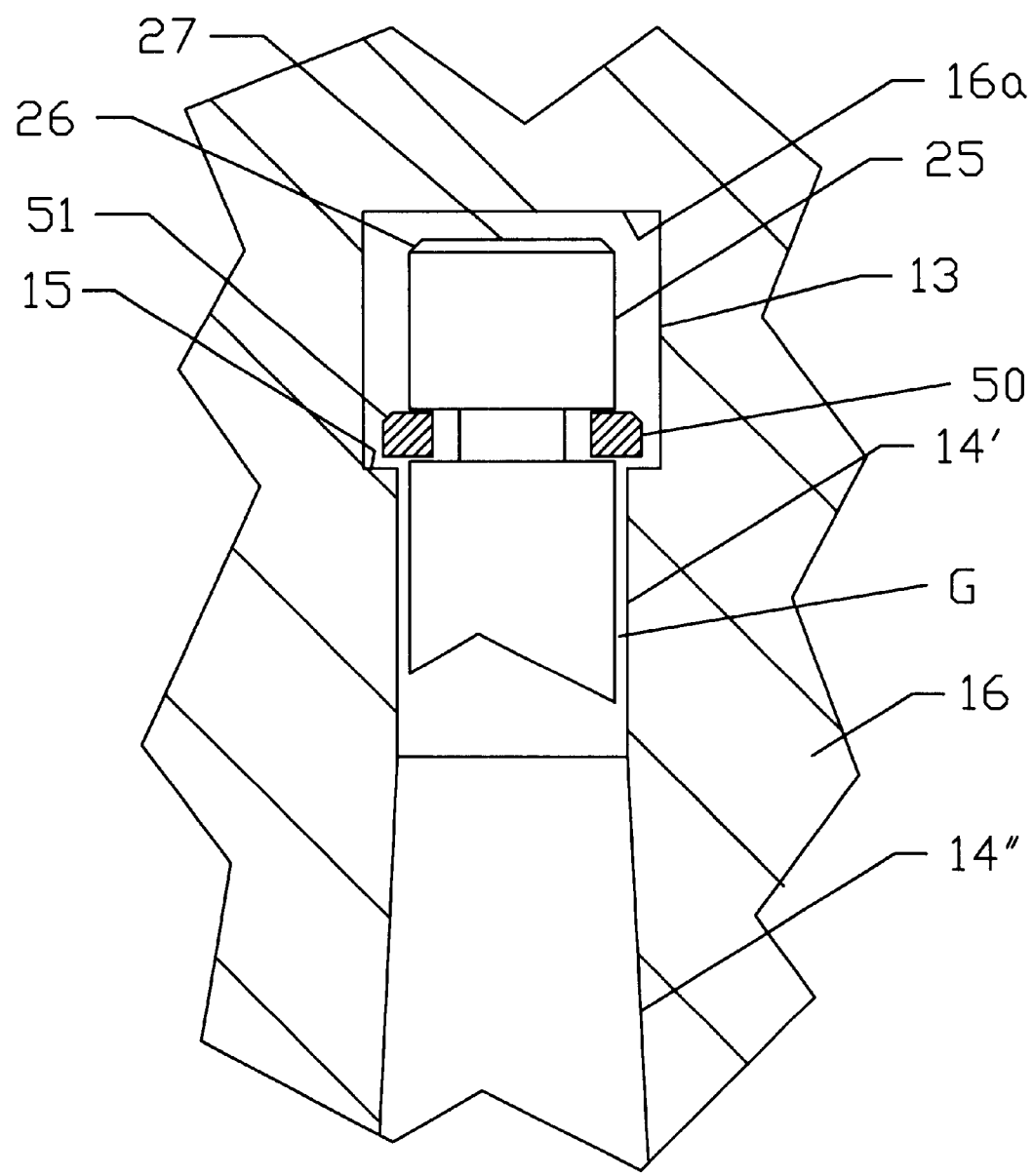

FIGS. 11a and 11b shows one way that the externally threaded member, i.e., 16, 16' 16", 116, 216, 316, 416, 516, 616 and 716, may be installed onto a respective connecting member, i.e., 20, 20', 20", 120, 220, 320, 420, 520, 620 and 720. Since each of the above-noted embodiments can use the same construction with regard to how the externally threaded member is rotatably mounted to the connecting member, this aspect of the invention with only be described in detail with regard to the embodiment shown in FIGS. 1a–b. However, it should be understood that the same technique can be utilized to assemble each if the other disclosed embodiments.

As discussed above, the connecting member 20 is solid rod-like and/or pin-like member and has the shape of a shaft or pin and may be made of any convenient material, such as plastic, wood, metal, composite, etc. However, steel is preferred since the head 25 may have to withstand significant hammering forces against the surface 27, e.g., when the first end (not shown) is driven into the substrate using a hammer or other similar driving tool. As is evident from FIG. 11a, the head portion 25 is arranged at an upper end of the second end 23 of the connecting member 20. This head 25 has one or more surfaces 27 which are designed to engage one or more internal surfaces 16a of the externally threaded member 16. A groove 24 is formed in the second end 23 just below the head 25. This groove 24 is an annular recess and is designed to receive a snap-ring 50. The snap-ring 50 has a tapered portion or chamber 51 which facilitates its entry into the axial opening 14 of the externally threaded member 16. Such split snap-rings 50 are conventionally known. The opening 14 has a lower outwardly tapered or conical section 14", i.e., whose internal diameter becomes smaller in the direction of surface 16a. The opening 14 also includes a cylindrical section 14' and an expanded cylindrical section 13.

The head 25 of the connecting member 20 has a chamfer 26 in order to facilitate entry of the head 25 into the opening 14. In this regard, it can be see that the tapered portion 14" acts to contract the snap-ring 50 (i.e, its diameter gets smaller) when the externally threaded body 16 is moved downwards, i.e., surface 16a moves towards surface 27. The expanded opening section 13 includes a retaining shoulder 15 which traps the snap-ring 50 after it and the head 25 passes into the expanded opening section 13. This can be seen in FIG. 11b wherein it is shown that the snap-ring 50 has expanded to a diameter that is greater than the diameter of cylindrical section 14'. As can be discerned from FIG. 11b, the gap between surface 16a and surface 27, as well as the gap between the bottom surface of the snap ring 50 and the shoulder 15 define the maximum axial limit of movement of the externally threaded member 16 with respect to the connecting member 20, and also serve as clearances to allow the externally threaded member 16 to rotate with respect to the connecting member 20 thereby preventing significant frictional engagement between the externally threaded member 16 and the connecting member 20. In this regard, it is preferred that each of these gaps be controlled to approximately 1/64 of an inch or less. However, these gaps can be greater or smaller without leaving the scope of the invention. A similar gap G is also provided between the opening 14 and connecting member 20

Figure 12:
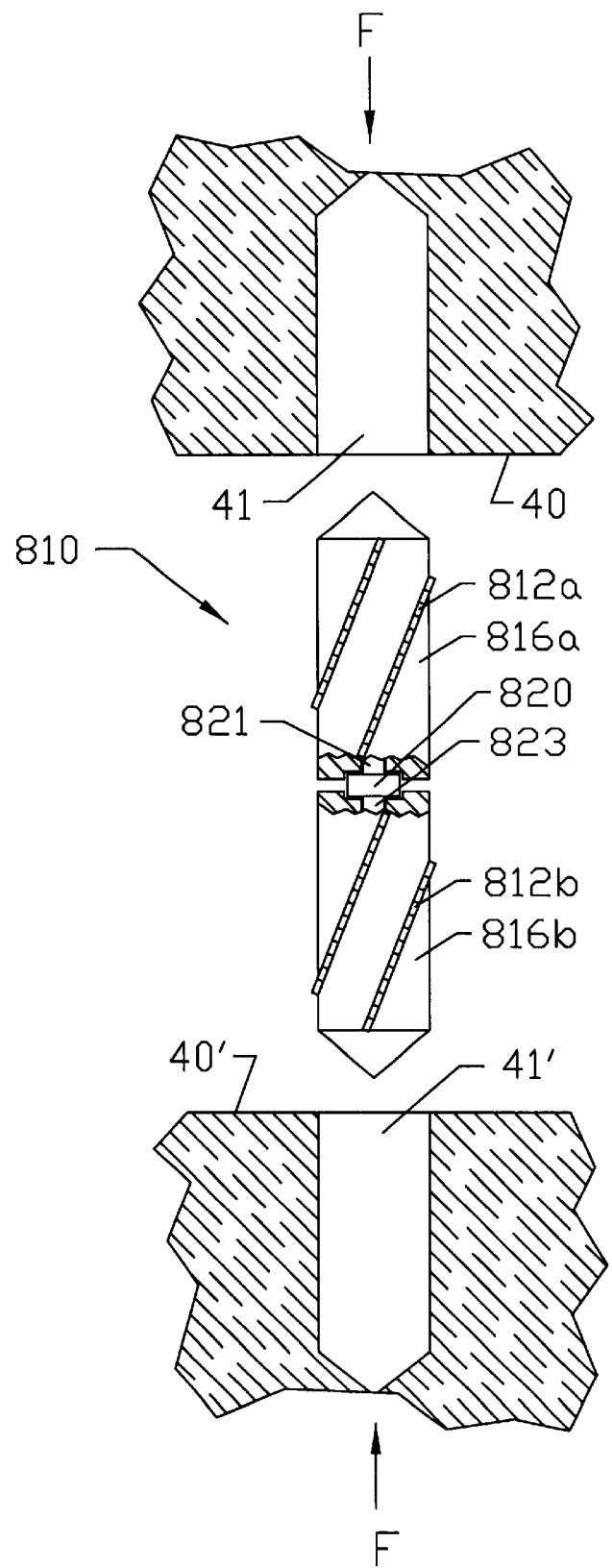
FIG. 12 shows another embodiment of a fastener which a single connecting member has two opposite facing externally threaded members, each of which is adapted to self-thread into an article upon the application of opposing forces.

FIG. 12 shows still another embodiment of the fastener 810 which is somewhat similar to that shown in FIG. 3, with like features (not all of which are shown in this figure) being described with reference numbers increased by 800. However, this embodiment is different from that of FIG. 3 in that it has two rotatably mounted externally threaded members 816a and 816b in place of a single externally threaded member. The fastener 810 includes a connecting member 820 that has a first end 821 and a second end 823. The first end 821 is shaped similar to that of the second end 823, and each of these ends is formed just like end 23 shown in FIG. 1a. Moreover, unlike the previous embodiments, this fastener 810 is not attachable to a surface 30 of a substrate S, but instead is designed to connect two articles 40 and 40' together when the articles are forced against the fastener 810. The connecting member 820 has a shoulder 822 which is provided or located in the center of the connecting member 820 and similarly has two stops or stop surfaces, for the purpose of preventing contact between bottom surfaces of the two external threaded members 816a and 816b. As in the previous embodiments, the connecting member 820 is solid rod-like and/or pin-like device and has the shape of a shaft or pin and may be made of any convenient material, such as plastic, wood, metal, composite, etc. However, a composite or metal is preferred so that the two articles 40 and 40' can be secured together more securely. Although not shown, the connecting member 820 may be tubular in order to save weight, provided it has sufficient strength to function for its intended purpose.

In this embodiment, each of the externally threaded members 816a and 816b have external threads 812a and 812b, respectively. However, the threads 812a and 812b in this embodiment differ in that they are formed like those described in FIG. 3. As with the previous embodiments, these threads 812a and 812b may take the form of a variety of thread shapes and sizes such as those of the type shown, whether conventional or otherwise, provided such threads are capable of self-threading into an opening 41 and 41' that is already formed in an article 40 and 40', when each article is forced against the fastener 810. In this regard, it should be understood that, as with the previous embodiments, the externally threaded members 816a and 816b are designed to rotate substantially freely or otherwise with respect to the connecting member 820, so as to be able to thread into the openings 41 and 41' and/or into the article 40 and 40'. The externally threaded members 816a and 816b and the connecting member 820 of this embodiment is otherwise similar than that shown in FIG. 1a. Again, as this embodiment differs from that of FIG. 3 mainly with regard to the internal configuration of each of the externally threaded members 816a and 816b, the description regarding how the externally threaded members 816a and 816b are connected and/or otherwise assembled to the connecting member 820 as well as the rotatable mounting of the externally threaded members 816a and 816b onto the connecting member 820 will not be described again.

FIGS. 13a–13c show various ways that the second end of the connecting member may be configured. In FIG. 13a, the head 25' includes a conical or tapered opening 28 and a straight screw driver slot 29. Otherwise, the head 25' and/or second end 23 is similar to that shown in FIG. 11b. The purpose of this screw driver slot 29 is, of course, to allow a straight screw driver (not shown) to rotate or torque the connecting member 20''', particularly when the connecting member 20 has a first end 21 that is shaped like a screw and is to be forced into the substrate S (see e.g., FIG. 2). In FIG. 13b, the head 25" includes a rounded, curved, concave, or spherical opening 28' and a straight screw driver slot 29. Otherwise, the head 25''' and/or second end 23 is similar to that shown in FIG. 11b. Again, the purpose of this screw driver slot 29 is, of course, to allow a straight screw driver (not shown) to rotate or torque the connecting member $20^{IV}$, particularly when the connecting member $20^{IV}$ has a first end that is shaped like a screw and is to be forced into the substrate S (see e.g., FIG. 2). In FIG. 13c, the head 25''' includes rounded or curved edge 29 and a cross-shaped impression 29'. Additionally, a narrow cylindrical section 23' forms the second end. The purpose of this cross-shaped impression 29' is, of course, to allow a Philips type screw driver (not shown) to rotate or torque the connecting member $20^{IV}$, particularly when the connecting member $20^{IV}$ has a first end that is shaped like a screw and is to be forced into the substrate (see e.g., FIG. 2). This embodiment shown in FIG. 13c is particularly designed to function with externally threaded members which have an internal construction similar to that shown in FIG. 15c which will be described in detail later on.

Figure 14A:
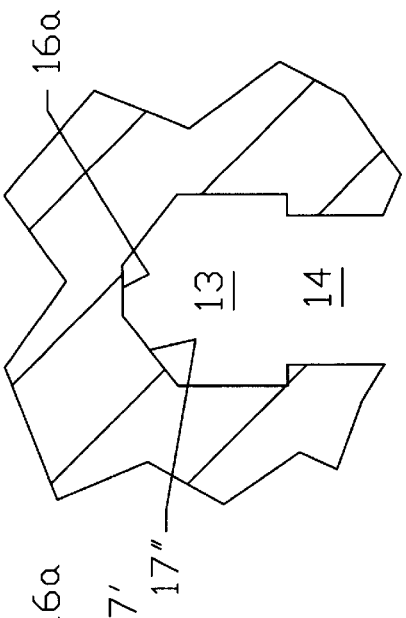
Figure 14B:
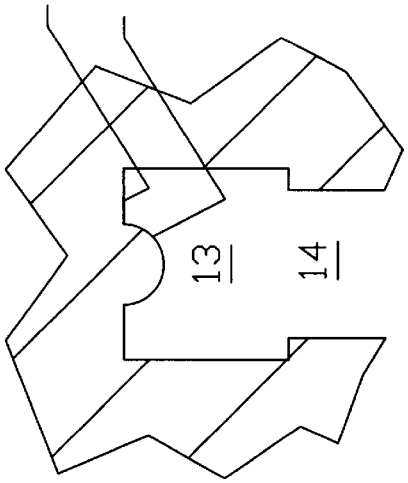
FIG. 14b shows one embodiment in cross-section of the externally threaded member. This embodiment has a rounded external bearing surface that is adapted to engage the rounded external bearing surface shown in FIG. 13b.
Figure 14C:
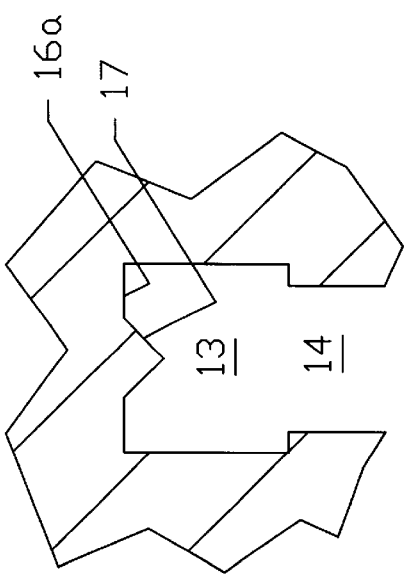
FIG. 14c shows one embodiment in cross-section of the externally threaded member. This embodiment has a tapered external bearing surface that is adapted to engage the rounded external bearing surface shown in FIG. 13c.

FIGS. 14a–14c show various ways that the expanded section 13 of the internal opening 14 of the externally threaded member may be configured. In FIG. 14a, the surface 16a includes a conical or tapered projection 17 which is adapted and/or otherwise configured to engage and/or otherwise contact the conical opening 28 in FIG. 13a. Otherwise, the externally threaded member is similar to that shown in FIGS. 11a and 11b. The purpose of this projection 17 is to act as a bearing support surface, i.e., the surfaces of projection 17 will rotatably engage the surfaces of the opening 28 in the connecting member 20''' and also act to center the externally threaded member with regard to the connecting member 20''' (not shown). In FIG. 14b, the surface 16a includes a rounded or spherical projection 17' which is adapted and/or otherwise configured to engage and/or otherwise contact the rounded opening 28' in FIG. 13b. Otherwise, the internal construction of the externally threaded member is similar to that shown in FIGS. 11a and 11b. The purpose of this projection 17' is to act as a bearing support surface, i.e., the surfaces of projection 17' will rotatably engage the surfaces in the opening 28' in the connecting member 20'', and also act to center the externally threaded member with regard to the connecting member $20^{IV}$ (not shown). In FIG. 14c, the surface 16a includes tapered edges 17'' which are adapted and/or otherwise configured to engage and/or otherwise contact the rounded edges 29 in FIG. 13c. The purpose of these edges 17'' is to act as a bearing support surfaces, i.e., the surfaces of these edges 17'' will rotatably engage the rounded surfaces 29 of the connecting member $20^V$, and also act to center the externally threaded member with regard to the connecting member $20^V$ (not shown).

Figure 15C:
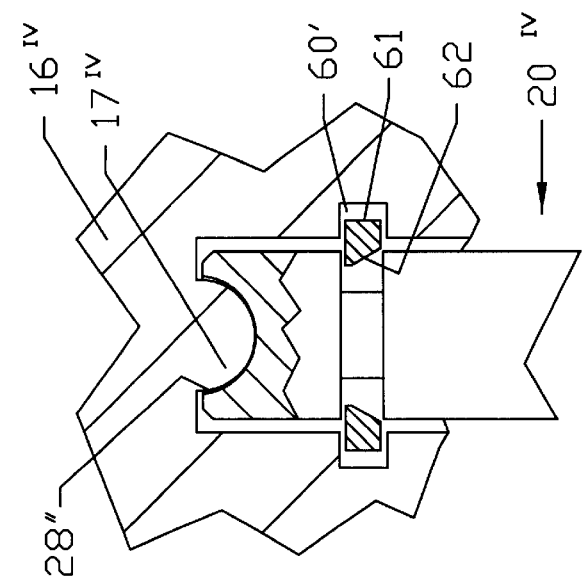
FIG. 15c shows one way that a connecting member similar to that shown in FIG. 13c can be coupled to the externally threaded member shown in FIG. 14c.
Figure 15B:
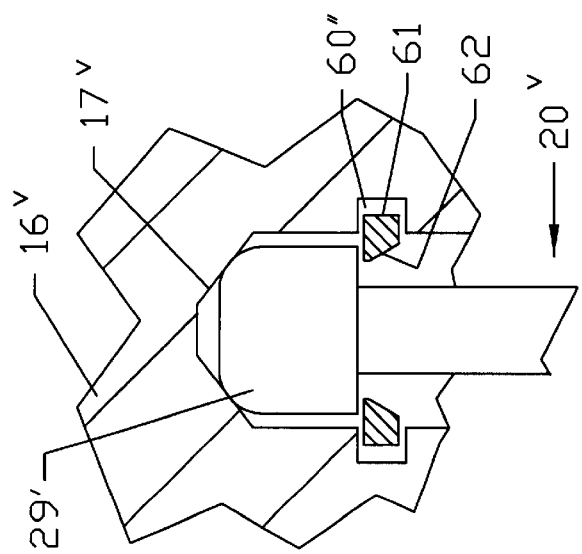
FIG. 15b shows one way that a connecting member similar to that shown in FIG. 13b can be coupled to the externally threaded member shown in FIG. 14b.
Figure 15A:
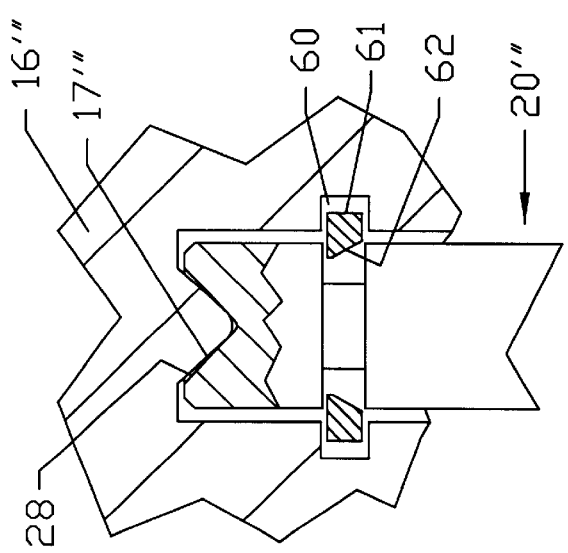

FIGS. 15a–15c show different variations of how a connecting member can be mounted with regard to an externally threaded member. In FIG. 15a, the connecting member 20''' is otherwise similar to that shown in FIG. 13a. However, it is notable that the externally threaded member 16''' differs from that shown in FIG. 14a in that no expanded section 13 is utilized. Instead, a short expanded section 60 is used to retain a snap-ring 61. This snap-ring 61 is designed to be pre-installed into the short expanded portion 60 and is adapted to expand when the externally threaded member 16''' is forced against the connecting member 20'''. To facilitate this insertion, a chamfer 62 is provided on the snap-ring 61 which acts as a lead in for the connecting member 20'''. In FIG. 15b, the connecting member $20^{IV}$ is otherwise similar to that shown in FIG. 13b. However, it is notable that the externally threaded member $16^{IV}$ differs from that shown in FIG. 14b in that no expanded section 13 is utilized. Instead, a short expanded section 60' is used to retain a snap-ring 61. This snap-ring 61 is designed to be pre-installed into the short expanded section 60' and is adapted to expand when the externally threaded member $16^{IV}$ is forced against the connecting member $20^{IV}$. To facilitate this insertion, a chamfer 62 is provided on the snap-ring 61 which acts as a lead in for the connecting member $20^{IV}$. In FIG. 15c, the connecting member $20^V$ is otherwise similar to that shown in FIG. 13c. However, it is notable that the externally threaded member $16^V$ differs from that shown in FIG. 14c in that no expanded section 13 is utilized. Instead, a short expanded section 60'' is used to retain a snap-ring 61. This snap-ring 61 is designed to be pre-installed into the short expanded section 60'' and is adapted to expand when the externally threaded member $16^V$ is forced against the connecting member $20^V$. To facilitate this insertion, a chamfer 62 is provided on the snap-ring 61 which acts as a lead in for the connecting member $20^{IV}$.

FIGS. 15a–15c also illustrate the interaction between the connecting members 20'''–$20^V$ and the externally threaded members 16'''–$16^V$. Here, it can be seen how the projection 17''' acts as a bearing support surface with the connecting member 20''', i.e., the surfaces of projection 17''' will rotatably engage surfaces of the opening 28 in the connecting member 20''', and also act to center the externally threaded member 16''' with regard to the connecting member 20'''. In FIG. 15b, the concave, rounded or spherical projection $17^{IV}$ is shown to be adapted and/or otherwise configured to engage and/or otherwise contact the rounded opening 28''. The purpose of this projection $17^{IV}$ is to act as a bearing support surface, i.e., the surfaces of this projection $17^{IV}$ will rotatably engage surfaces in the opening 28'' in the connecting member $20^{IV}$, and also act to center the externally threaded member $16^{IV}$ with regard to the connecting member $20^{IV}$. In FIG. 15c, the rounded edges 29' are adapted and/or otherwise configured to engage and/or otherwise contact the tapered edges $17^V$. The purpose of the tapered edges $17^V$ is to act as bearing support surfaces, i.e., the surfaces of these edges $17^V$ will rotatably engage the rounded surfaces 29' of the connecting member $20^V$, and also act to center the externally threaded member $16^V$ with regard to the connecting member $20^V$.

Figure 16:
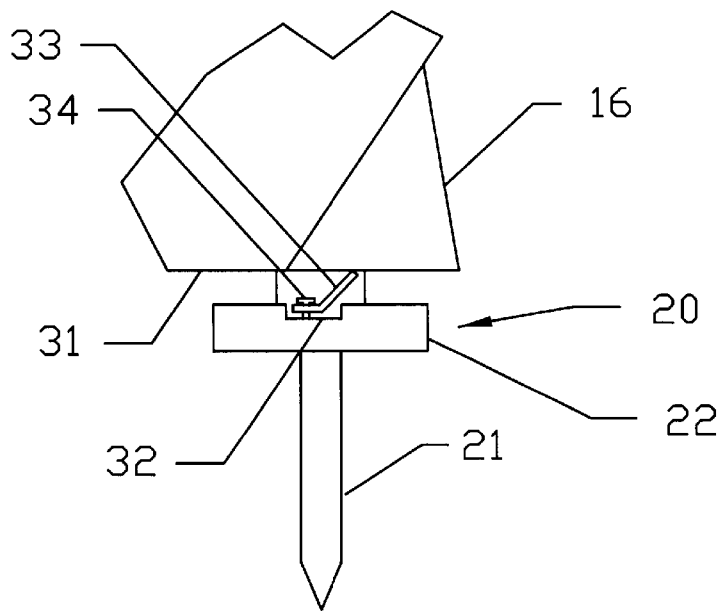
FIG. 16 shows an external partial side view of one embodiment of the fastener. This embodiment is similar to that shown in FIGS. 1a–b, except that it additionally includes a mechanism for preventing backwards rotation of the externally threaded member, i.e., the mechanism allows rotation in the self-threading rotation direction, but prevents rotation in the opposite direction.
Figure 17B:
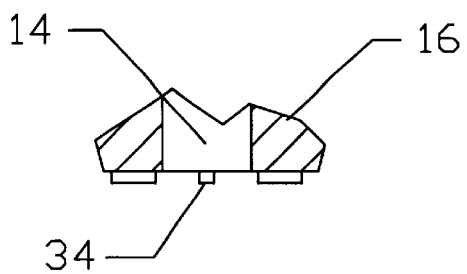
Figure 17A:
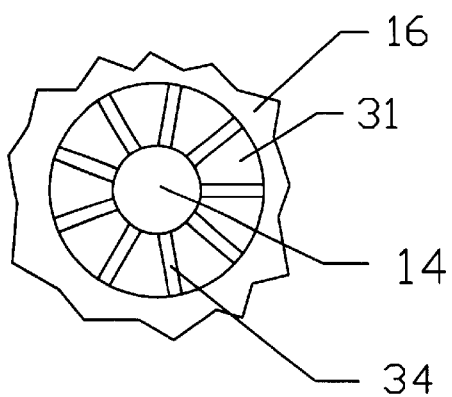
FIG. 17a shows a partial axial view of the teeth that are located on a bottom surface of the externally threaded member shown in FIG. 16.

FIGS. 16, 17a and 17b show an embodiment of the fastener similar to that shown in FIGS. 1a–b, except that the fastener utilizes an anti-rotation and/or a one-way rotation system. The connecting member 20 has a first end 21 and a second end similar to that shown in FIG. 1a. However, unlike the embodiment shown in FIGS. 1a–1b which uses a freely rotatable externally threaded member 16, in this embodiment, the externally threaded member 16 has a bottom surface which includes a plurality of teeth or raised projections 34 (see FIGS. 17a–b). Although not shown, these teeth or projections 34 could instead be replaced with similarly indentations. These projections 34 are arranged in radial configuration, i.e., radially, as can be seen in FIG. 17a. A flexible plate-like element 33 (which may be in the form of a flat bent spring) is mounted to the shoulder 22 of the connecting member 20 via a rivet 34. However, it should be noted that the element 33 may be connected to the shoulder 22 in any number of ways, whether conventional or otherwise. To facilitate the mounting of the element 33, an indentation is provided on the shoulder 22. As is notable from these figures, the element 33 deflects downwards and then upwards every time the externally threaded member 16 rotates clockwise (when view from a direction below the first end and towards the second end) and a projection 34 engages the element 33. This action is similar to that of a ratchet, i.e., in a similar manner the externally threaded member 16 is only allowed to rotate in one direction, e.g., clockwise. Of course, the invention contemplates reversing the position of the element 33 so that the externally threaded member 16 can rotate in an opposite direction, e.g., counterclockwise. This would be necessary when the external threads 12 are reversed to, e.g., left hand threads. This anti-rotation feature is particularly advantageous when it is desired to prevent the article (see e.g., FIG. 3) from being removed from the fastener after it has been penetrated by the fastener.

FIGS. 18a–18b show a different variation of a fastener 910 which illustrates how a connecting member 920 can be mounted with regard to an externally threaded member 916.

In FIG. 18a, the connecting member 920 is otherwise similar to that shown in FIG. 1a. However, it is notable that the externally threaded member 916 differs from that shown in FIG. 1a in that the end (i.e., tapered portion 11 in FIG. 1a) is removed to expose the head 925 of the second end 923 of the connecting member 920. This design allows the externally threaded member 916 to be pre-installed onto the connecting member 920, i.e., the connecting member 920 can be driven or otherwise attached to the substrate S with the externally threaded member 916 already installed on the connecting member 920. As can be seen in FIGS. 18a–b, the head 925 projects above and remains exposed. Accordingly, using this type of fastener, a user can hammer the head 925 of the connecting member 920 in order to drive the first end 921 of the connecting member 920 into the substrate S without damaging the externally threaded member 916. Alternatively, if the head 925 is configured like that of, e.g., anyone of FIGS. 13a–c (not shown), and if the first end 921 is configured like that of FIG. 2 (not shown), the head 925 can similarly be accessed by a screw driver in order to cause the first end 921 to be attached to the substrate 30. In FIG. 18b it can be seen that externally threaded member 916 includes an internal short expanded section 960 to retain a snap-ring 50. This snap-ring 50 is designed to be pre-installed onto the connecting member 920 in a manner similar to that described with regard to FIGS. 11a–b and just as in the embodiment shown in FIG. 1a.

In this regard, the externally threaded member 916 may be installed onto the connecting member 920 in the same manner as shown in FIGS. 11a–b. The connecting member 920 is similarly solid rod-like and/or pin-like device and has the shape of a shaft or pin and may be made of any convenient material, such as plastic, wood, metal, composite, etc. However, steel is preferred since the head 925 may have to withstand significant hammering forces against the surface 927, when the first end 921 is driven into the substrate S using a hammer or other similar driving tool. As can be seen, the head portion 925 is arranged at an upper end of the second end 923 of the connecting member 920. A groove 924 is formed in the second end 923 just below the head 925 and is designed to receive the snap-ring 50. The snap-ring 50 has a tapered portion 51 which facilitates its entry into the axial opening 914 of the externally threaded member 916. The opening 914 has a lower outwardly tapered or conical section, a cylindrical section, and an internal expanded cylindrical section 960. The head 925 of the connecting member 920 additionally has a chamfer 926 in order to facilitate entry of the head 925 into the opening 914. The tapered portion of the opening 914 acts to contract the snap-ring 50 (i.e, its diameter gets smaller) when the externally threaded body 916 is moved downwards on installation, similar to that shown in FIGS. 11a–b. The expanded opening section 960 includes retaining shoulders 915a and 915b which traps the snap-ring 50 after it and the head 925 passes the expanded opening section 960. This can be seen if FIG. 8b wherein it is shown that the snap-ring 50 has expanded to a diameter that is greater than the diameter of cylindrical section 914. The gap between the bottom surface of the snap ring 50 and the shoulder 915a and the gap between the top surface of the snap ring 50 and the shoulder 915b define the axial movement limits of the externally threaded member 916 with respect to the connecting member 920, and also serve to allow the externally threaded member 916 to rotate with respect to the connecting member 920 without significant frictional engagement. In the regard, it is preferred that each gap be controlled to approximately 1/64 of an inch or less. However, the gaps can be greater or smaller without leaving the scope of the invention.

Figure 19:
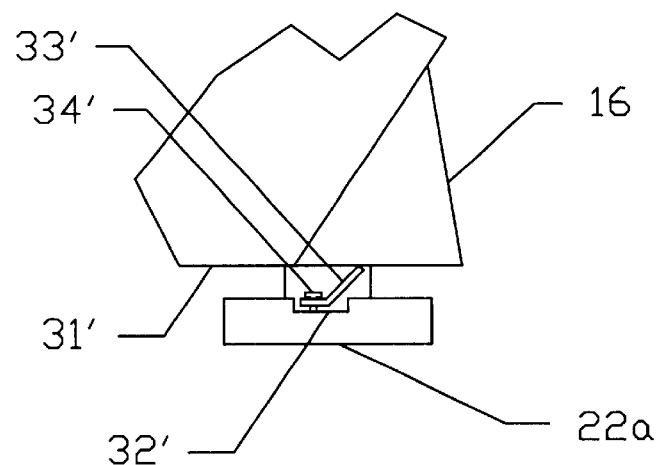
FIG. 19 shows an external partial side view of another embodiment of the fastener. The first end has a surface that is designed to secure the fastener to a static surface using any number of connection techniques, conventional or otherwise, such as e.g., adhesives, welding, hook and loop, etc., in order secure the fastener to the static substrate.

FIG. 19 shows still another embodiment of the fastener 16 similar to that shown in FIGS. 16–17b, except that the fastener 16 utilizes an attachment surface 22a in place of a first end 21 type attachment, i.e., unlike the embodiment shown in FIG. 16, no first end (i.e., no nail or screw) is used in this embodiment. Again, all other features are the same as those described in FIGS. 16–17b with the exception that the surface 22a can be attached to a substrate via a non-penetrating attachment technique. In this regard, any attachment system or mechanism may be used to connect the surface 22a to a substrate such as, e.g., adhesives, bonding, welding, soldering, hook and loop, etc, whether such techniques are conventional or otherwise.

FIGS. 20a and 20b illustrate a fastener in which only two steps are required to attach the article to the surface. First the fastener is attached to the surface in a single step in a manner similar to that already described and thereafter the article is forced against the fastener and/or against the surface. This can be accomplished by first attaching the connecting member with the already installed external threading member onto the surface using either a hammer or screw driver, in order to position the first end into the substrate, until the shoulder contacts the surface. Then, the article, having an opening already formed therein, is forced against the fastener, whereby the externally threaded member is caused to rotate as it threads or cuts its way into the opening. Full connection is achieved when the article surface rests against or is otherwise positioned adjacent to surface. Of course, if the article is to be attached at more than one point, as will typically be the case, a fastener for each opening can be provided and/or utilized.

Although not shown, the invention also contemplates that the first end may have other configurations such as that of a staple or other multi-penetrating spikes instead of the single nail end or single screw end shown and described herein. The first end may also be configured like that shown in FIG. 19, with the exception that instead of being attached to a surface by adhesives, it is attached by bolts, rivets or other connecting members, i.e., such connecting members connecting the shoulder to the surface. The fasteners described herein are not intended to be limited to any particular use described herein, and may be used in any environment wherein it is necessary to attach an article by forcing the article towards the fastener. Such application may include, but are not limited to, space applications and under sea environments. The invention may even be use to attach a framed painting with two or more fasteners being used to attach the frame to a wall surface.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A fastener that cuts into or self-threads into an article upon movement of the article towards the fastener, the fastener comprising:

a connecting member including a first end which is adapted to be secured to a surface and a second end;

a member rotatably mounted on the connecting member while being substantially axially retained with respect to the connecting member;

the member comprising an article engaging end and a side portion;

the side portion including at least one of a plurality of external threads, a plurality of external spline teeth and a plurality of external rows of teeth; and a stop surface integrally connected to the connecting member and arranged between the first end and the second end, wherein the stop surface is adapted to engage the surface, wherein the stop surface limits a depth of penetration of the first end, and wherein the stop surface is axially and rotatably fixed relative to the connecting member when the first end is not secured to the surface, wherein, when the article is moved into engagement with the side portion of the member of the fastener, the member is caused to rotate with respect to the connecting member and cut into the article, and further comprising at least one of:

the member rotates relative to the connecting member without an axial distance between a bottom surface of the member and the stop surface changing; and an axial distance between a bottom surface of the member and the stop surface is the same, before the member rotates relative to the connecting member, as the axial distance between the bottom surface of the member and the stop surface after the member rotates.

2. The fastener of claim 1, wherein, when the article is moved into engagement with the fastener, the member each of rotates with respect to the connecting member and cuts into the article.

3. The fastener of claim 1, wherein the member comprises the plurality of external threads.

4. The fastener of claim 1, wherein the member comprises the plurality of external spline teeth.

5. The fastener of claim 1, wherein the member comprises the plurality of external rows of teeth.

6. The fastener of claim 1, wherein the stop surface is arranged on a shoulder.

7. The fastener of claim 1, wherein the first end comprises a penetrating pointed tip which extends away from the stop surface.

8. The fastener of claim 1, wherein the first end comprises a penetrating threaded tip which extends away from the stop surface.

9. The fastener of claim 1, wherein the member includes a substantially cylindrical external surface.

10. The fastener of claim 1, wherein the member includes a substantially conical external surface.

11. The fastener of claim 1, wherein the article engaging end comprises an tapered end.

12. The fastener of claim 1, wherein the member comprises an axial opening which receives the second end of the connecting member.

13. The fastener of claim 1, wherein the member is adapted to slide onto the second end of the connecting member.

14. The fastener of claim 1, further comprising a one-way rotation mechanism for preventing a counter-rotation of the member with respect to the connecting member.

15. The fastener of claim 1, wherein the first end comprises:

another member rotatably mounted on the connecting member and being substantially axially retained with respect to the connecting member;

the other member comprising at least one of an external thread, a spline and a row of teeth; and wherein, when another article is moved into engagement with the other member of the fastener, the other member is caused to at least one of rotate with respect to the connecting member and cut into the article.

16. A method of securing an article to a surface using the fastener of claim 1, the method comprising:

attaching the first end of connecting member to the surface;

ensuring that the stop surface abuts the surface; and causing the member to penetrate into the article by moving the article towards the member, wherein, when the article is moved into engagement with the fastener, the member is caused to at least one of rotate with respect to the connecting member and cut into the article.

17. The method of claim 16, further comprising:

before the moving, connecting the member to the connecting member.

18. A fastener that cuts into or self-threads into an article upon movement of the article towards the fastener, the fastener comprising:

a connecting member including a first end which is adapted to be secured to a surface and a second end;

a member rotatably mounted on the connecting member and being substantially axially retained with respect to the connecting member;

the member comprising at least one of an external thread, a spline and a row of teeth;

a stop surface arranged between the first end and the second end, wherein the stop surface is adapted to engage the surface; and a snap ring for axially retaining the member on the connecting member after the member is slid onto the connecting member, wherein, when the article is moved into engagement with the member of the fastener, the member is caused to at least one of rotate with respect to the connecting member and cut into the article.

19. A fastener that self-threads into an article upon movement of the article towards the fastener, the fastener comprising:

a connecting member comprising a first end which is adapted to be secured to a surface and a second end;

a member that is slidable onto the second end and that is rotatable with respect to the connecting member after the member is slid onto the second end, the member thereby being substantially axially retained by and rotatable with respect to the connecting member;

the member comprising an article engaging end and a side portion which includes an external helix structure that is in the form of at least one of an external thread, a spline and at least one row of teeth;

a stop surface axially and rotatably fixed to the connecting member and arranged between the first end and the second end, wherein the stop surface is adapted to engage the surface, wherein, when the article is forced against the fastener, the member is caused to rotate with respect to the connecting member and to self-thread into the article, wherein engagement between the helix structure and the article causes the member to rotate with respect to the connecting member as the article is forced onto the member.

20. A method of securing an article to a surface using the fastener of claim 19, the method comprising:

attaching the first end of connecting member to the surface;

ensuring that the stop surface abuts the surface: and causing the member to rotate by moving the article towards the member, wherein, when the article is moved into engagement with the fastener, the member is caused to rotate with respect to the connecting member and cut into the article.

21. The method of claim 20, further comprising:

before the moving, sliding the member onto the connecting member.

22. The fastener of claim 19, wherein the stop surface is attachable to the surface via at least one of an adhesive, welding, and hook and loop fastening.

* * * * *